(12) United States Patent
Zorgui et al.

(10) Patent No.: US 12,532,277 B2
(45) Date of Patent: Jan. 20, 2026

(54) PHASE COHERENCE DISCONTINUITY FOR SENSING SIGNALS

(71) Applicant: QUALCOMM Incorporated, San Diego, CA (US)

(72) Inventors: Marwen Zorgui, San Diego, CA (US); Srinivas Yerramalli, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 18/064,220

(22) Filed: Dec. 9, 2022

(65) Prior Publication Data
US 2024/0196350 A1    Jun. 13, 2024

(51) Int. Cl.
*H04W 56/00* (2009.01)
(52) U.S. Cl.
CPC .............................. *H04W 56/0035* (2013.01)
(58) Field of Classification Search
CPC ....... H04L 5/0044; H04L 5/14; H04L 5/0048; H04L 5/0094; H04L 5/0051; H04L 1/189; H04L 1/1896; H04W 74/0833; H04W 72/1268; H04W 74/002; H04W 72/23; H04W 48/16
See application file for complete search history.

(56) References Cited

U.S. PATENT DOCUMENTS

| | | | |
|---|---|---|---|
| 11,916,705 B2* | 2/2024 | Sun | H04W 72/1273 |
| 2021/0050974 A1* | 2/2021 | Manolakos | H04L 5/0044 |
| 2021/0392679 A1* | 12/2021 | Kim | H04W 74/002 |
| 2022/0224473 A1* | 7/2022 | Ly | H04L 5/0048 |
| 2023/0362812 A1* | 11/2023 | Loehr | H04W 76/28 |
| 2024/0107444 A1* | 3/2024 | Hu | H04W 76/28 |
| 2024/0219548 A1* | 7/2024 | Han | H04W 12/104 |
| 2024/0430930 A1* | 12/2024 | Kim | H04W 74/0833 |
| 2025/0132890 A1* | 4/2025 | Zhang | H04L 5/0044 |

FOREIGN PATENT DOCUMENTS

WO    2023249695 A1    12/2023

OTHER PUBLICATIONS

International Search Report and Written Opinion—PCT/US2023/080508—ISA/EPO—Mar. 25, 2024.

* cited by examiner

*Primary Examiner* — Jung Liu
(74) *Attorney, Agent, or Firm* — QUALCOMM Incorporated

(57) ABSTRACT

A first node may transmit a set of sensing signals. The first node may transmit a phase coherence indication based on a set of phase coherence discontinuities associated with the set of sensing signals to a second node. The second node may receive the set of sensing signals. The set of sensing signals received by the second node may be reflected off of a target object. The second node may receive the phase coherence indication based on the set of phase coherence discontinuities associated with the set of sensing signals. The second node may measure the set of sensing signals based on the phase coherence indication. The first node may be a transmitter node. The second node may be a receiver node. The first or second node may be one of a transmission reception point (TRP), a user equipment (UE), a sensing reference unit, or a positioning reference unit.

29 Claims, 18 Drawing Sheets

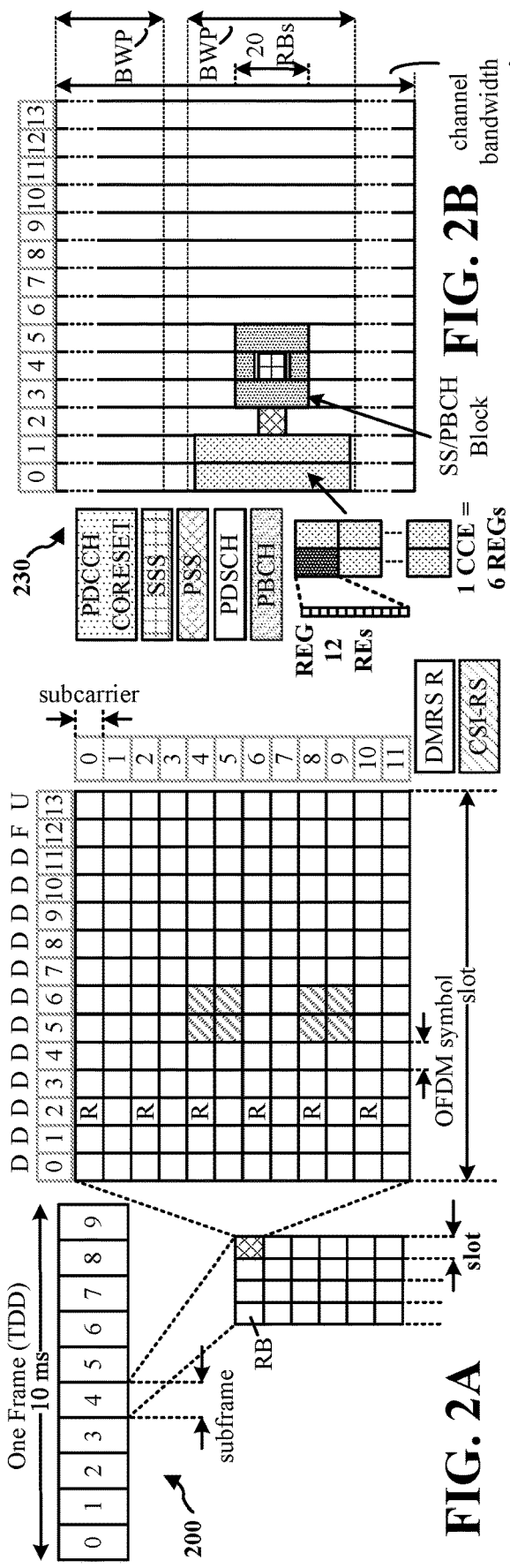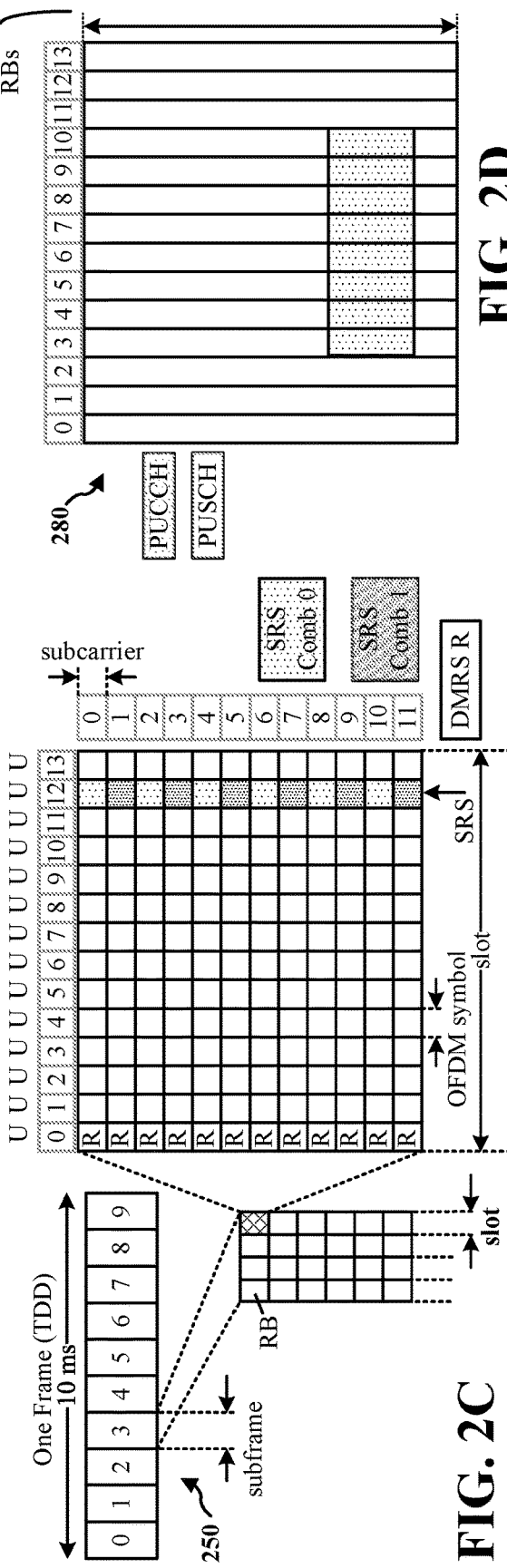
FIG. 2A  FIG. 2B  FIG. 2C  FIG. 2D

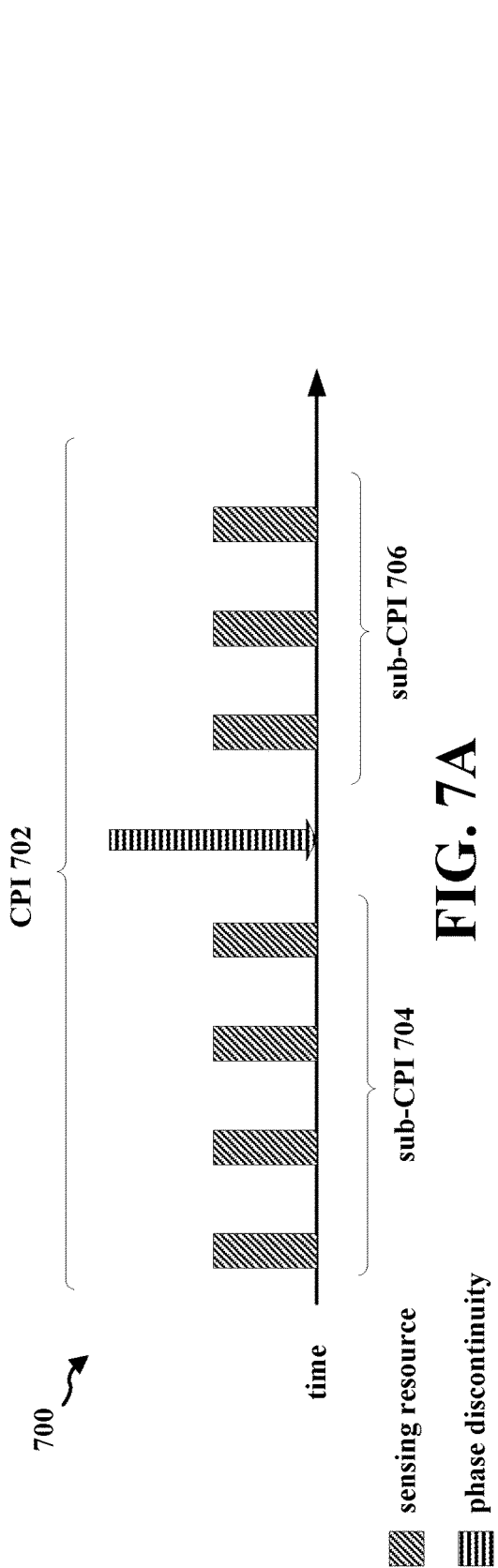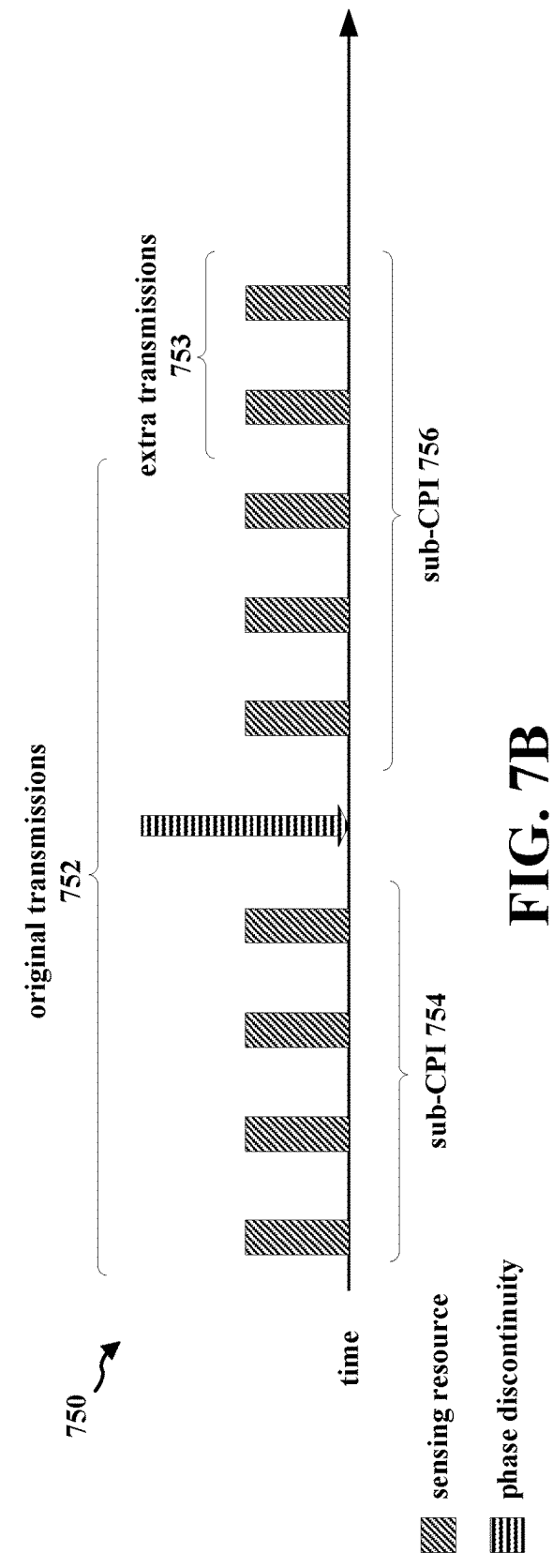

PHASE COHERENCE DISCONTINUITY FOR SENSING SIGNALS

TECHNICAL FIELD

The present disclosure relates generally to communication systems, and more particularly, to a wireless sensing system with phase coherence between sensing signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first node. The first node may be a transmitter node. The apparatus may transmit a set of sensing signals. The apparatus may transmit a phase coherence indication based on a set of phase coherence discontinuities associated with the set of sensing signals to a second node.

In an aspect of the disclosure, a method, a computer-readable medium, and an apparatus are provided. The apparatus may include a second node. The second node may be a receiver node. The apparatus may receive a set of sensing signals. The apparatus may receive a phase coherence indication based on a set of phase coherence discontinuities associated with the set of sensing signals from a first node. The apparatus may measure the set of sensing signals based on the phase coherence indication.

In an aspect of the disclosure, a method, a computer-readable medium, and an apparatus are provided. The apparatus may include a sensing entity. The apparatus may obtain an indication of a set of phase coherence discontinuities associated with a set of sensing signals. The apparatus may transmit a sub-coherent processing interval (sub-CPI) configuration to at least one of a transmitter node or a receiver node based on the indication of the set of phase coherence discontinuities.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

FIG. 7A is a diagram illustrating an example of a coherent processing interval (CPI) with a phase discontinuity and a plurality of sub-coherent processing intervals (sub-CPIs).

FIG. 7B is a diagram illustrating another example of a CPI with a phase discontinuity and a plurality of sub-CPIs.

DETAILED DESCRIPTION

Figure 1:
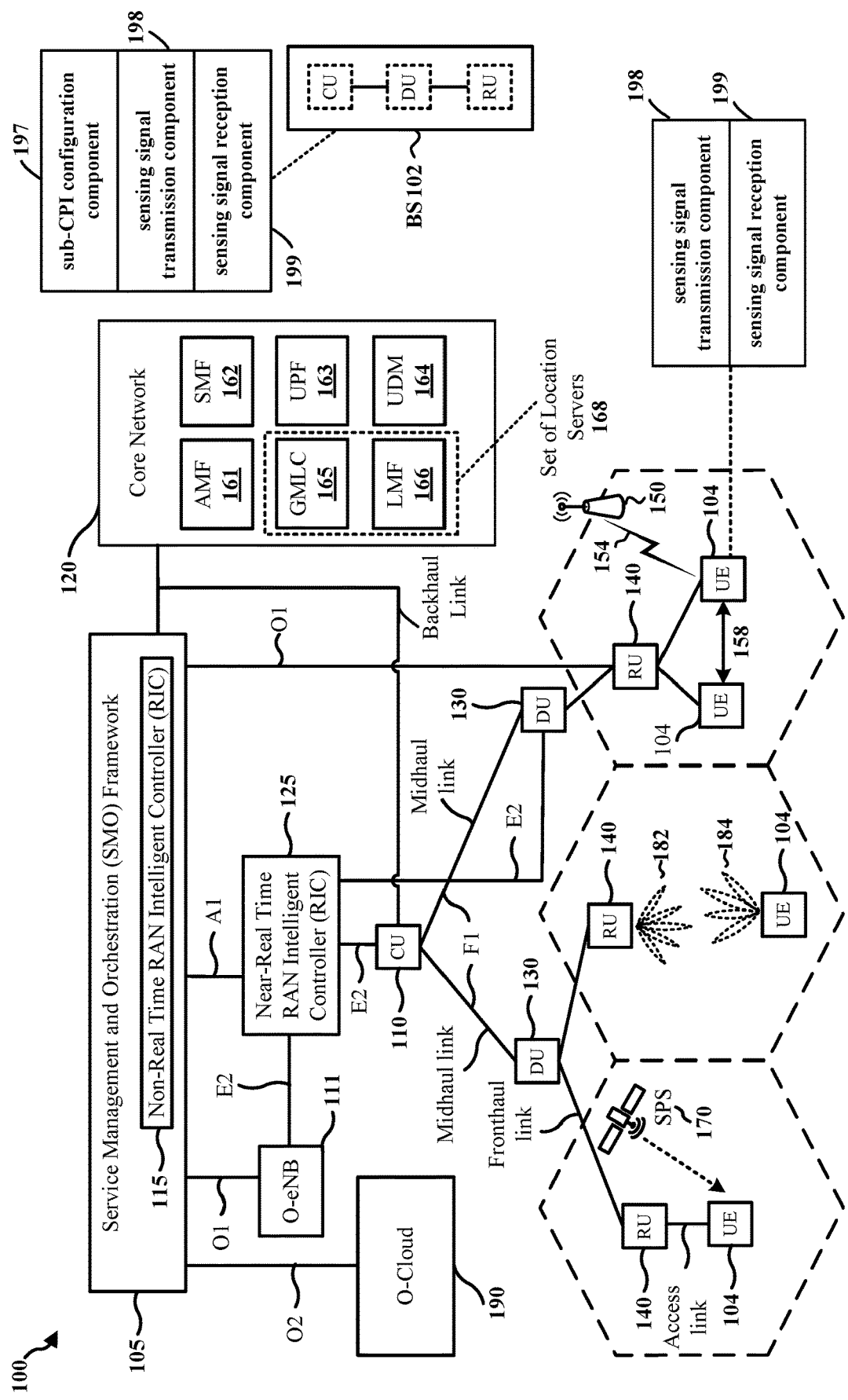
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may have a sensing signal transmission component 198 that may be configured to transmit a set of sensing signals. The sensing signal transmission component 198 may be configured to transmit a phase coherence indication based on a set of phase coherence discontinuities associated with the set of sensing signals to a second node. In certain aspects, the UE 104 and/or the base station 102 may have a sensing signal reception component 199 that may be configured to receive a set of sensing signals. The sensing signal reception component 199 may be configured to receive a phase coherence indication based on a set of phase coherence discontinuities associated with the set of sensing signals from a first node. The sensing signal reception component 199 may be configured to measure the set of sensing signals based on the phase coherence indication. In certain aspects, the base station 102 may have a sub-CPI configuration component 197 that may be configured to obtain an indication of a set of phase coherence discontinuities associated with a set of sensing signals. The sub-CPI configuration component 197 may be configured to transmit a sub-coherent processing interval (sub-CPI) configuration to at least one of a transmitter node or a receiver node based on the indication of the set of phase coherence discontinuities. Although the following description may be focused on phase coherence discontinuities, the concepts described herein may be applicable to other similar areas, such as any interference that disrupts a set of continuous signals. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and 24 slots/subframe. The subcarrier spacing may be equal to $2^\mu*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
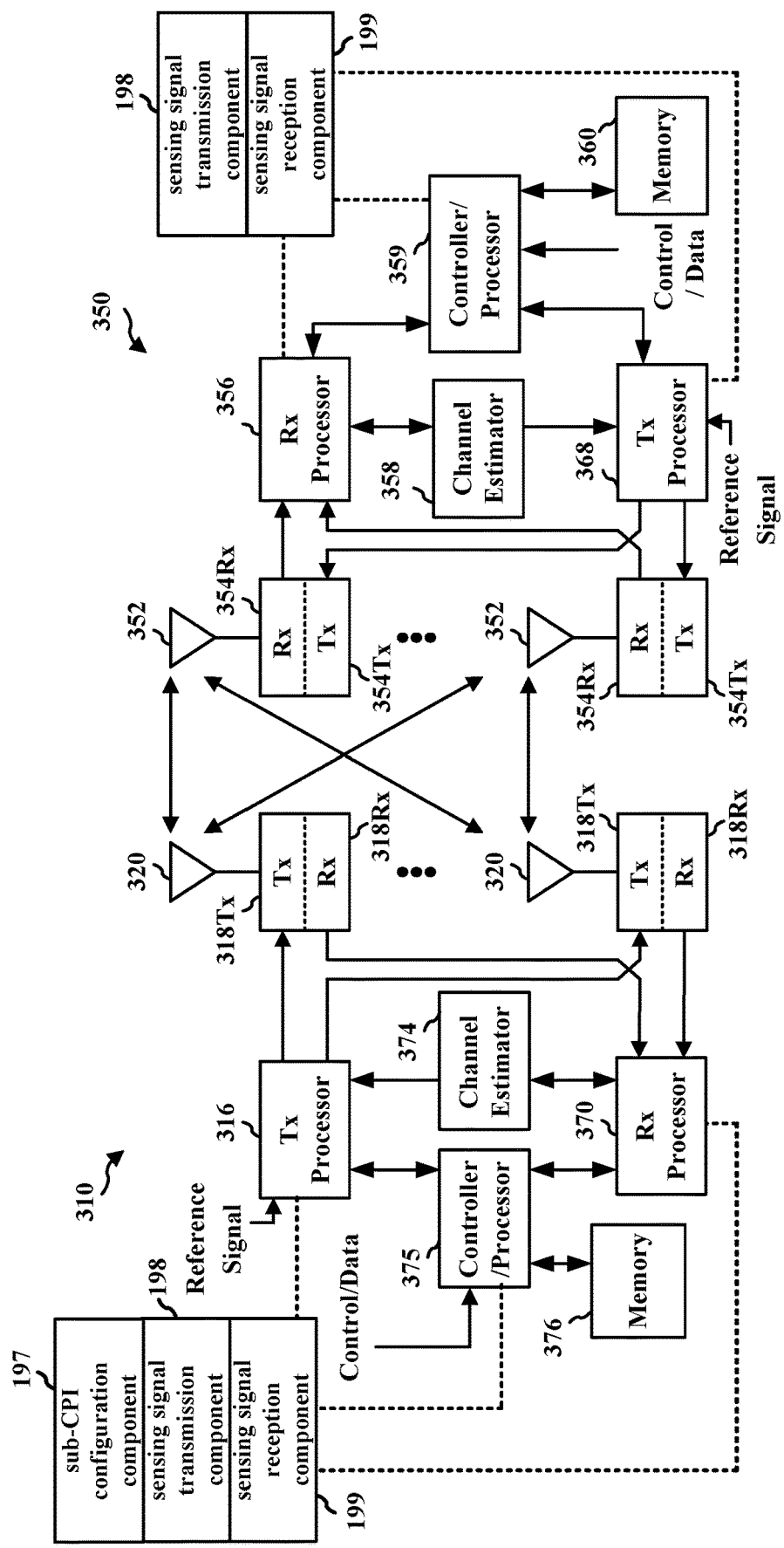
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the sensing signal transmission component 198 of FIG. 1.

At least one of the Tx processor 368, the Rx processor 356, and the controller/processor 359 may be configured to perform aspects in connection with the sensing signal reception component 199 of FIG. 1.

At least one of the Tx processor 316, the Rx processor 370, and the controller/processor 375 may be configured to perform aspects in connection with the sensing signal transmission component 198 of FIG. 1.

At least one of the Tx processor 316, the Rx processor 370, and the controller/processor 375 may be configured to perform aspects in connection with the sensing signal reception component 199 of FIG. 1.

At least one of the Tx processor 316, the Rx processor 370, and the controller/processor 375 may be configured to perform aspects in connection with the sub-CPI configuration component 197 of FIG. 1.

Figure 4:
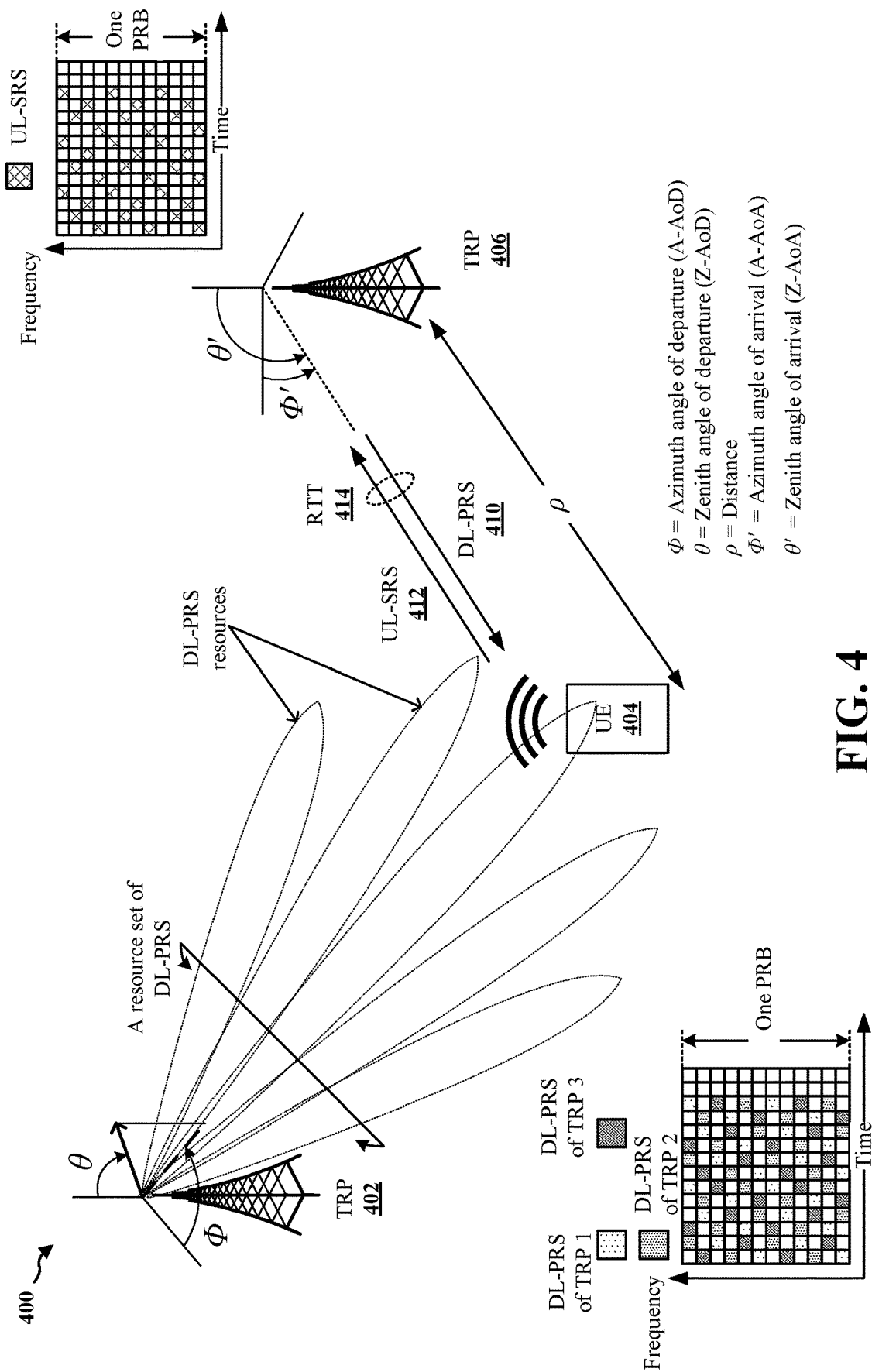
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_Tx}$ and receive DL positioning reference signals (PRS) (DL-PRS) 410 at time $T_{PRS\_Rx}$. The TRP 406 may receive the UL-SRS 412 at time $T_{SRS\_Rx}$ and transmit the DL-PRS 410 at time $T_{PRS\_Tx}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_Rx} - T_{PRS\_Tx}\| - \|T_{SRS\_Tx} - T_{PRS\_Rx}\|$. Accordingly, multi-RTT positioning may make use of the UE Rx-Tx time difference measurements (i.e., $|T_{SRS\_Tx} - T_{PRS\_Rx}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_Rx} - T_{PRS\_Tx}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
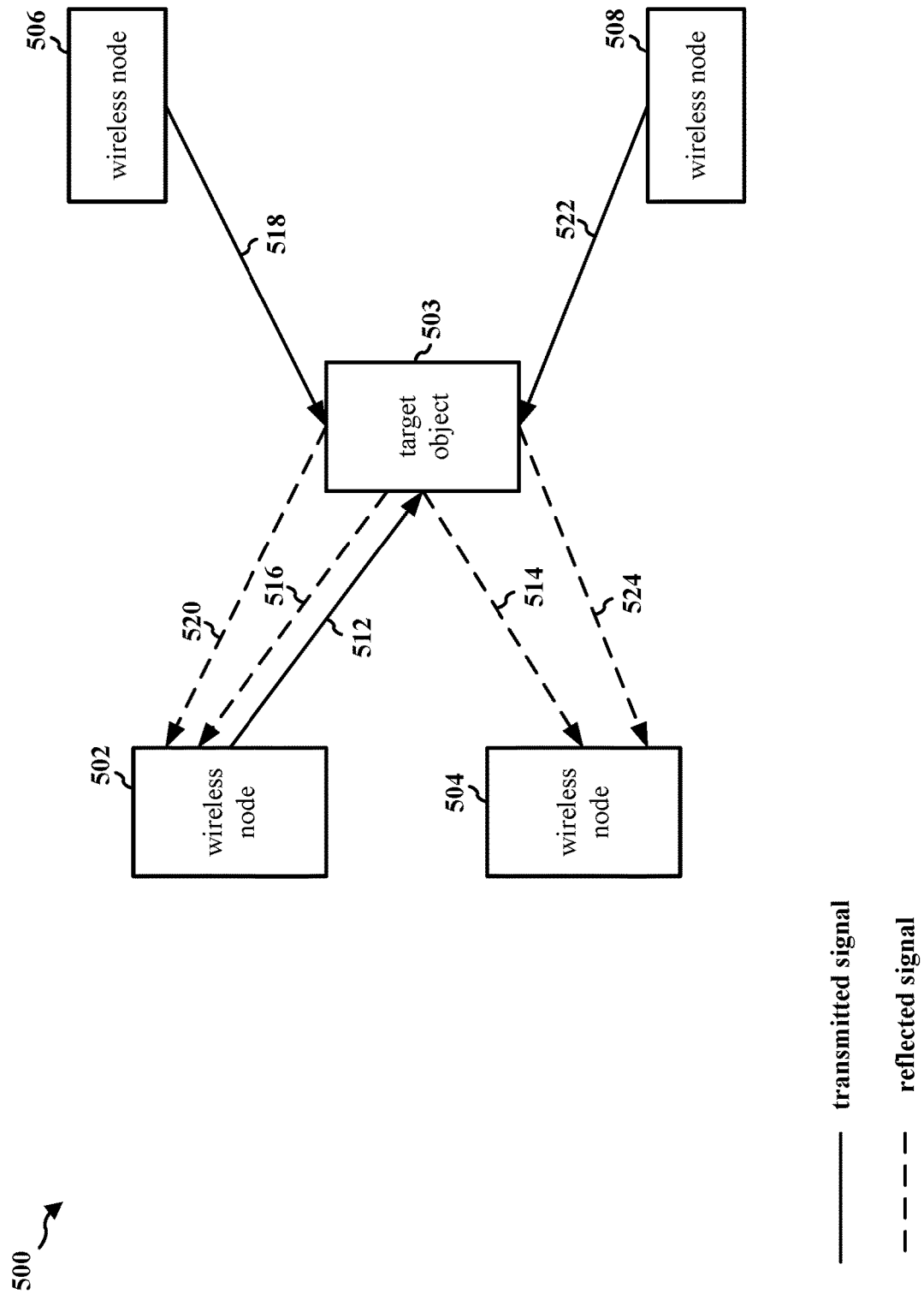
FIG. 5 is a diagram illustrating an example of sensing based on RS measurements.

FIG. 5 is a diagram 500 illustrating an example of sensing based on sensing signal measurements. In one aspect, the wireless node 502 may perform monostatic sensing, where the wireless node 502 may transmit a set of sensing signals 512 at the target object 503, the target object 503 may reflect the set of sensing signals 512 as the reflected set of sensing signals 516 at the wireless node 502, and the wireless node 502 may measure the reflected set of sensing signals 516 from the target object 503. In another aspect, the wireless node 502 and the wireless node 504 may perform bistatic sensing, where the wireless node 502 may transmit a set of sensing signals 512 at the target object 503, the target object 503 may reflect the set of sensing signals 512 as the reflected set of sensing signals 514 at the wireless node 504, and the wireless node 504 may measure the reflected set of sensing signals 514 from the target object 503. In another aspect the wireless node 502 and the wireless node 506 may perform multi-static sensing, where in addition to the wireless node 502 measuring the reflected set of sensing signals 516 from the target object 503 using monostatic sensing, the wireless node 506 may transmit a set of sensing signals 518 at the target object 503, the target object 503 may reflect the set of sensing signals 518 as the reflected set of sensing signals 520 at the wireless node 502, and the wireless node 502 may measure the reflected set of sensing signals 520 from the target object 503. In another aspect the wireless node 502, the wireless node 504, and the wireless node 508 may perform multi-static sensing, where in addition to the wireless node 504 measuring the reflected set of sensing signals 514 from the target object 503 using bistatic sensing, the wireless node 508 may transmit a set of sensing signals 522 at the target object 503, the target object 503 may reflect the set of sensing signals 522 as the reflected set of sensing signals 524 at the wireless node 504, and the wireless node 504 may measure the reflected set of sensing signals 524 from the target object 503. Each wireless node may be any wireless device configured to transmit or receive wireless signals, such as UEs, network nodes, TRPs, or base stations. For example, the wireless node 502 may be a network node configured to transmit the set of sensing signals 512 at the target object 503 and measure the reflected set of sensing signals 516 from the target object 503. In another example, the wireless node 502 may be a network node configured to transmit the set of sensing signals 512 at the target object 503, and the wireless node 504 may be a UE configured to measure the reflected set of sensing signals 514 from the target object 503.

The wireless node 502 may conduct one or more sensing measurements on the reflected set of sensing signals 516 and/or the reflected set of sensing signals 520. In one aspect, the wireless node 502 may calculate a distance or a range between the wireless node 502 and the target object 503 based on a round trip time (RTT) between when the wireless node 502 transmits the set of sensing signals 512 and when the wireless node 502 receives the reflected set of sensing signals 516. In one aspect, the wireless node 502 may calculate a distance or a range that the set of sensing signals 518 and the reflected set of sensing signals 520 travels based on a time between when the wireless node 506 transmits the set of sensing signals 518 and when the wireless node 502 receives the reflected set of sensing signals 520. In one aspect, the wireless node 502 may calculate a location of the target object 503 based on a plurality or range or distance measurements, for example via triangulation using known positions of the wireless nodes 502 and 506 and the calculated range or distance measurements. In one aspect, the wireless node 502 may calculate a velocity of the target object 503 based on a first calculated location of the target object 503 based on the reflected set of sensing signals 516 and/or the reflected set of sensing signals 520 measured at a first time, and a second calculated location of the target object 503 based on the reflected set of sensing signals 516 and/or the reflected set of sensing signals 520 measured at a second time. In one aspect, the wireless node 502 may calculate an AoA of the reflected set of sensing signals 516 and/or an AoD of the set of sensing signals 512 based on a plurality of ports that transmitted the set of sensing signals 512 and a plurality of ports that received the reflected set of sensing signals 516. In one aspect, the wireless node 502 may calculate an AoA of the reflected set of sensing signals 520 and/or an AoD of the set of sensing signals 518 based on a plurality of ports that transmitted the set of sensing signals 518 and a plurality of ports that received the reflected set of sensing signals 520.

Similarly, the wireless node 504 may conduct one or more sensing measurements on the reflected set of sensing signals 514 and/or the reflected set of sensing signals 524. In one aspect, the wireless node 504 may calculate a distance or a range that the set of sensing signals 512 and the reflected set of sensing signals 514 travels based on a time between when the wireless node 502 transmits the set of sensing signals 512 and when the wireless node 504 receives the reflected set of sensing signals 514. In one aspect, the wireless node 504 may calculate a distance or a range that the set of sensing signals 522 and the reflected set of sensing signals 524 travels based on a time between when the wireless node 508 transmits the set of sensing signals 522 and when the wireless node 504 receives the reflected set of sensing signals 524. In one aspect, the wireless node 504 may calculate a location of the target object 503 based on a plurality or range or distance measurements, for example via triangulation using the known positions of wireless nodes 502, 504, and 508, and the calculated range or distance measurements. In one aspect, the wireless node 504 may calculate a velocity of the target object 503 based on a first calculated location of the target object 503 based on the reflected set of sensing signals 514 and/or the reflected set of sensing signals 524 measured at a first time, and a second calculated location of the target object 503 based on the reflected set of sensing signals 514 and/or the reflected set of sensing signals 524 measured at a second time. In one aspect, the wireless node 504 may calculate an AoA of the reflected set of sensing signals 514 and/or an AoD of the set of sensing signals 512 based on a plurality of ports that transmitted the set of sensing signals 512 and a plurality of ports that received the reflected set of sensing signals 514. In one aspect, the wireless node 504 may calculate an AoA of the reflected set of sensing signals 524 and/or an AoD of the set of sensing signals 522 based on a plurality of ports that transmitted the set of sensing signals 522 and a plurality of ports that received the reflected set of sensing signals 524.

In order to perform Doppler estimates or velocity estimates of a target object, such as the target object 503 in FIG. 5, or of a UE, such as the UE 404 in FIG. 4, the receiver wireless node may be configured to measure sensing signals, such as positioning reference signals (PRSs) or sounding reference signals (SRSs) with phase coherency. A reference signal used to measure a position of a UE or a target object may be referred to as a sensing signal. While a transmitting device may be configured to transmit a set of sensing signals having phase coherency, a set of sensing signals may lose phase coherency in some environments.

Figure 6:
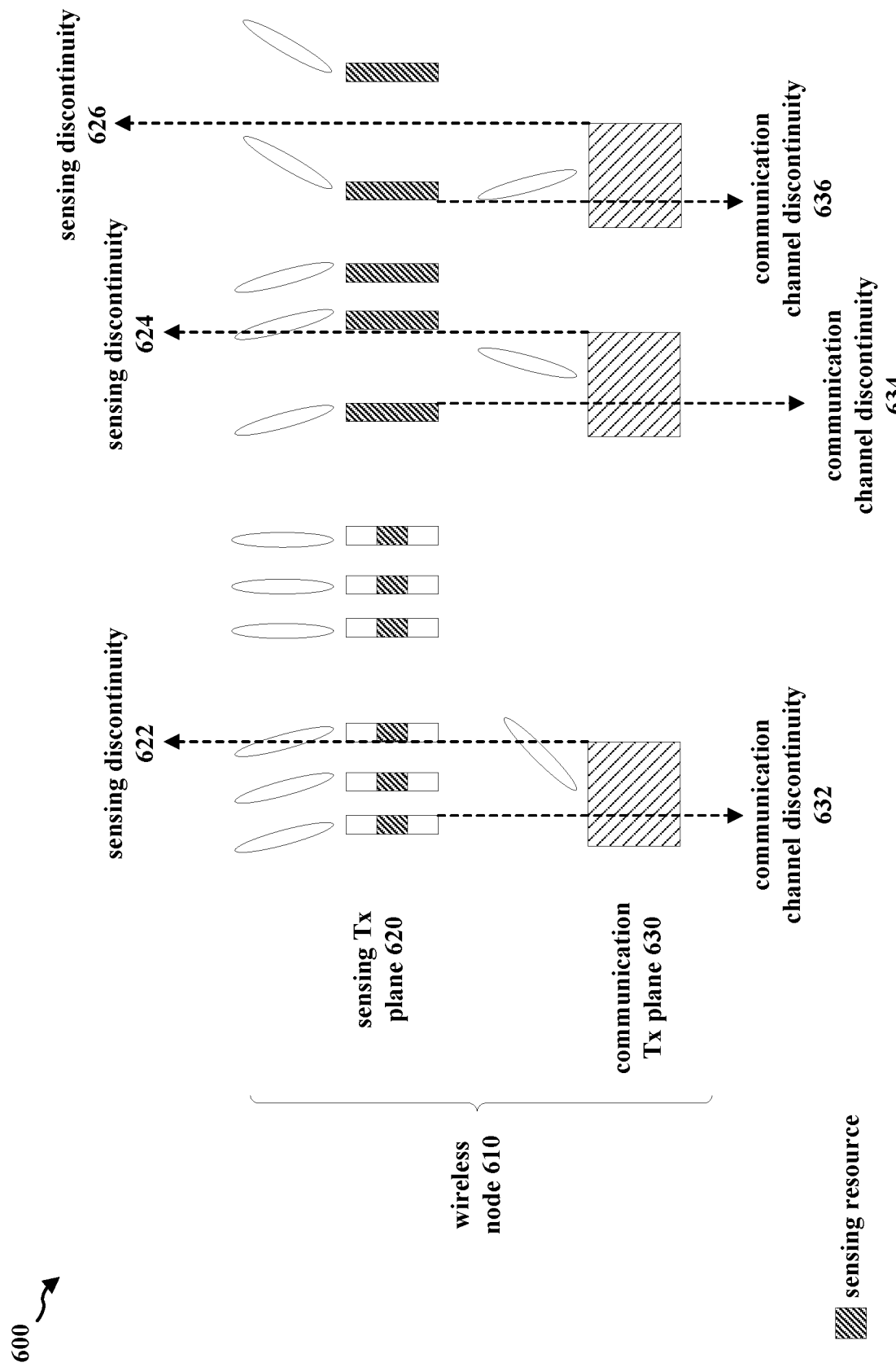
FIG. 6 is a diagram illustrating an example of a sensing transmission plane and a communication transmission plane.

FIG. 6 is a diagram 600 illustrating an example of a wireless node 610 operating with a sensing Tx plane 620 and a communication Tx plane 630. The sensing Tx plane 620 may have a series of sensing signals transmitted to a target object, such as the target object 503 in FIG. 5, or a UE, such as the UE 404 in FIG. 4. The communication Tx plane 630 may have a series of communication signals transmitted to a receiving device, such as the UE 104 or the base station 102 in FIG. 1. When a sensing signal changes in a same waveform as another beam, the other beam may experience a phase discontinuity due to a change in a radio frequency (RF) state or a change in a propagation path. For example, the communication signals transmitted at the communication Tx plane 630 may cause phase discontinuities at the sensing signals at sensing discontinuity 622, sensing discontinuity 624, and sensing discontinuity 626. Similarly, the sensing signals transmitted at the sensing Tx plane 620 may cause sensing discontinuities at the communication channel discontinuity 632, the communication channel discontinuity 634, and the communication channel discontinuity 636.

A transmitter node, such as the wireless node 502 in FIG. 5 or the TRP 406 in FIG. 4, may be configured to transmit a set of sensing signals within a period of time such that all of the set of sensing signals transmitted within the period of time have phase coherency. Such a period of time may also be referred to as a coherent processing interval (CPI). However, during a CPI, one or more phase discontinuities may occur, breaking the phase continuity between consecutive sensing signals. A receiver node measuring a set of sensing signals during a CPI may use a phase coherence indication to determine which portions of the set of sensing signals may have phase coherence with one another, and which portions of the set of sensing signals do not have phase coherency with one another. As the transmitter node may know when a phase discontinuity event occurs which may disrupt the coherence of a transmission of a set of sensing signals, the transmitter node may signal phase discontinuity events to relevant wireless nodes, such as a receiver node or a sensing entity. The receiver node may perform sub-CPI processing on portions of a CPI based on the phase discontinuities to ensure that the set of sensing signals measured have phase continuity. The receiver node may report such sensing signal considerations to relevant nodes, such as the transmitter node or a sensing entity. The transmitter node may dynamically extend a sensing resource set length to meet a desired minimum CPI length in the event of a phase discontinuity.

In one aspect, a first node may be a transmitter node that transmits a set of sensing signals, and a second node may be a receiver node that measures the set of sensing signals. The first node may transmit the set of sensing signals to the second node. The second node may receive the set of sensing signals from the first node. The first node may transmit a phase coherence indication based on a set of phase coherence discontinuities associated with the set of sensing signals. The second node may receive the phase coherence indication based on the set of phase coherence discontinuities associated with the set of sensing signals. The second node may measure the set of sensing signals based on the phase coherence indication.

FIG. 7A is a diagram 700 illustrating an example of a CPI 702 having a set of sensing signals transmitted with phase coherency. A phase discontinuity may break the phase coherency of the set of sensing signals transmitted during the CPI 702. Measuring the set of sensing signals during the time domain of the CPI may result in inaccuracies, because not all of the sensing signals have phase coherency. The sensing measurements may be more accurate if the receiver node measured the set of sensing signals during the sub-CPI 704, which does not have a phase discontinuity, or during the sub-CPI 706, which also does not have a phase discontinuity.

In some aspects, a receiver node may be configured to measure a continuous set of sensing signals having a minimum length, or a transmitter node may be configured to transmit a continuous set of sensing signals having a minimum length. The minimum length may be configured in any suitable manner, for example by a condition of a wireless network, or by a sensing entity configuring or requesting a sensing occasion. In one aspect, a transmitter node may be configured to transmit sensing signals until at least a threshold number of sensing signals is transmitted. The threshold number may be specified by a sensing entity. The threshold number may correspond with a desired minimum sub-CPI length. If the transmitter node determines that a phase discontinuity occurred that has prevented the transmitter node from transmitting the threshold number of sensing signals that have phase continuity, the transmitter node may be configured to continue transmitting sensing signals until the transmitter node transmits a continuous number of phase coherent sensing signals with a length that is greater or equal to the threshold number. The transmitter node may be configured to repeatedly initiate transmission of the continuous number of phase coherent sensing signals a second threshold number of times. If the transmitter node fails to transmit the continuous number of phase coherent sensing signals the second threshold number of times, the transmitter node may drop transmissions until the next resource set of sensing signals. The transmitter node may be configured to signal to the receiver node of the extra transmissions, for example by transmitting a fast indication (e.g., via level 1 (L1) or level 2 (L2) signaling) of phase discontinuity of the receiving node.

FIG. 7B is a diagram 750 illustrating an example of a scheduled number of original transmissions 752 of a set of phase continuous sensing signals. The transmitter node may be configured to transmit a set of eight phase continuous sensing signals for the scheduled number of original transmissions 752. The transmitter node may be configured to transmit a minimum sub-CPI of five phase continuous sensing signals. After the transmitter node transmits four phase continuous sensing signals, a phase discontinuity may occur, causing the fifth sensing signal to not be phase continuous with the first four phase continuous sensing signals in the sub-CPI 754. While the transmitter node may originally be configured to transmit three more sensing signals, the transmitter node may, in response to determining that the scheduled number of original transmissions 752 does not have at least five phase continuous sensing signals, allocate the extra transmissions 753 to the set of sensing signals so that it transmits five phase continuous sensing signals as the revised sub-CPI 756.

Figure 8:
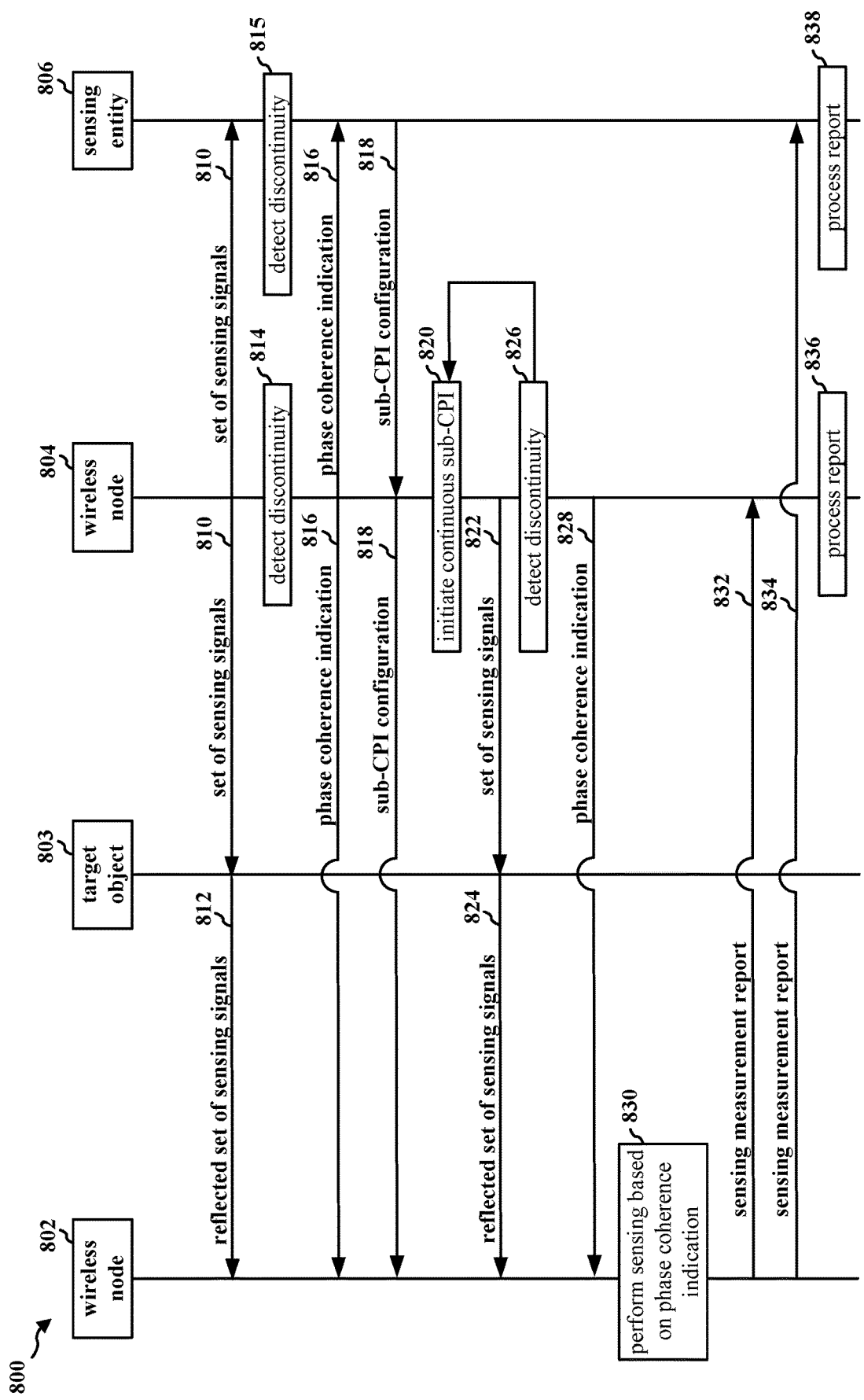
FIG. 8 is a connection flow diagram illustrating an example of sensing using phase coherence indications to mitigate phase coherence discontinuities.

FIG. 8 is a connection flow diagram 800 illustrating an example of a wireless network configured to use phase coherence indications to mitigate phase coherence discontinuities. The wireless node 804 may be a transmitter node. The wireless node 804 may be a TRP, a UE, a sensing reference unit, or a positioning reference unit. The wireless node 802 may be a receiver node. The wireless node 802 may be a TRP, a UE, a sensing reference unit, or a positioning reference unit.

The wireless node 804 may be configured to transmit the set of sensing signals 810 to the target object 803. The target object 803 may reflect the set of sensing signals 810 as the reflected set of sensing signals 812 at the wireless node 802. The wireless node 802 may receive the reflected set of sensing signals 812, At 830, the wireless node 802 may perform sensing on the reflected set of sensing signals 812 to calculate one or more parameters of the target object 803. For example, the wireless node 802 may measure the reflected set of sensing signals 812 to determine a velocity of the target object 803.

In some aspect, a phase discontinuity may occur. At 814, the wireless node 804 may determine that a phase discontinuity occurs, for example by determining that a communication transmission occurred before all of a set of sensing signals within a CPI have been transmitted. The wireless node 804 may transmit a phase coherence indication 816 to the wireless node 802. The wireless node 802 may receive the phase coherence indication 816. In other words, the wireless node 804 may communicate the phase coherence indication 816 to the wireless node 802 performing sensing measurements and computation.

In some aspects, the wireless node 804 may immediately transmit the phase coherence indication 816 to the wireless node 802 and may then continue transmitting the set of sensing signals as the set of sensing signals 822 to the target object 803. The target object 803 may reflect the set of sensing signals 822 as the reflected set of sensing signals 824 to the wireless node 802. The wireless node 802 may then determine which of the reflected set of sensing signals 812 or the reflected set of sensing signals 824 is larger, and may, at 830, perform sensing based on the larger set of sensing signals. In other aspects, the wireless node 804 may transmit the phase coherence indication 828 at the end of the CPI for the set of sensing signals 810, allowing for the wireless node 802 to first collect the set of reflected set of sensing signals

812, and perform sensing on the reflected set of sensing signals 812 based on the phase coherence indication 828. In other words, the wireless node 804 may transmit the phase coherence indication 816 either at the end of the set of sensing signals 810 or as soon as the discontinuity occurs, before the end of the set of sensing signals 810.

The phase coherence indication 816 may be provided to the wireless node 802 in different forms. In one aspect, the phase coherence indication 816 may be provided as a binary indication. The binary indication may indicate whether some phase discontinuity happened during the transmission of the set of sensing signals 810. A default behavior (an absence of an indication) may be interpreted as no discontinuity. In other words, the wireless node 804 may not transmit a phase coherence indication 816 to the wireless node 802, indicating to the wireless node 802 that no discontinuity occurred. In another aspect, the phase coherence indication 816 may be provided as the number of phase discontinuities that occurred during the transmission of the set of sensing signals 810. A number of zero may be used to indicate that no phase discontinuities occurred. In another aspect, the phase coherence indication 816 may be provided as the number of phase discontinuities that occurred during the transmission of the set of sensing signals 810 and their positions within the resource set (e.g., between the $3^{rd}$ and $4^{th}$ sensing signals, or during transmission of the $8^{th}$ sensing signal). In some aspects, the position of the phase discontinuity may be provided as a timestamp of the phase discontinuity event or by specifying a sensing signal after which the phase discontinuity event occurred.

In some aspects, the sensing entity 806 may be configured to monitor the set of sensing signals 810 or the phase coherence indication 816 to determine a phase discontinuity. The sensing entity 806 may be configured to perform sensing computations, such as generating a range-Doppler map or a point cloud based on sensing measurements. In some aspects, the sensing entity 806 may be configured to monitor the set of sensing signals 810 and, at 815, may detect a discontinuity in the set of sensing signals 810. The sensing entity 806 may transmit a sub-CPI configuration 818 to the wireless node 804, indicating to the wireless node 804 to transmit a continuous subset of phase coherent sensing signals in response to the detected discontinuity. In some aspects, the sensing entity 806 may transmit the sub-CPI configuration 818 to the wireless node 802, indicating to the wireless node 802 to perform sensing on at least a threshold number of continuous, coherent resources of the reflected set of sensing signals 812 or the reflected set of sensing signals 824. In another example, the sensing entity 806 may receive the phase coherence indication 816 transmitted by the wireless node 804. In response, the sensing entity 806 may transmit the sub-CPI configuration 818 to the wireless node 804 indicating to the wireless node 804 to transmit a continuous subset of phase coherent sensing signals in response to the phase coherence indication 816. In other words, the sensing entity 806 may be configured to configure the wireless node 804 and/or the wireless node 802 to perform sub-CPI processing in response to becoming aware of a phase discontinuity event. The sub-CPI processing may be associated with any sensing related computation that relies on coherent transmissions of sensing signals, such as range Doppler-Angle map generation or point cloud generation.

The sensing entity 806 may configure the sub-CPI processing to be done on the largest coherent sub-interval of the set of sensing signals 810 or the set of sensing signals 822. The term largest may be in terms of the number of coherent resources, or in terms of the number of coherent sensing signals. In some aspects, the sub-CPI configuration 818 may indicate for the wireless node 802 to perform sensing processing on the largest coherent sub-interval if the length of the largest coherent sub-interval meets or exceeds a configurable threshold value provided by the sensing entity 806. The sub-CPI configuration 818 may include an indication of the configurable threshold value. In some aspects, the sub-CPI configuration 818 may indicate for the wireless node 802 to perform non-coherent combining over coherently processed sub-CPIs with a length that meets or exceeds a configurable threshold value. For example, the wireless node 802 may be configured to perform coherent sub-CPI processing over three sub-intervals, where each sub-interval has a length that meets or exceeds the configurable threshold value, and then may average the output. The output may be weighted, such that a sub-interval with a longer length has a greater weight than a sub-interval with a shorter length. The wireless node 802 may indicate the weighted average length in the sensing measurement report 832 transmitted to the wireless node 804 or in the sensing measurement report 834 transmitted to the sensing entity 806.

In some aspects, in response to the wireless node 802 receiving a phase coherence indication 816, the wireless node 802 may drop sensing processing. The wireless node 802 may transmit a sensing measurement report 832 to the wireless node 804 and/or a sensing measurement report 834 to the sensing entity 806 that it dropped sensing processing in response to receiving the phase coherence indication 816. In some aspects, in response to the wireless node 802 receiving a phase coherence indication 816, the wireless node 802 may divide the sensing resources into a plurality of groups of the same size, or approximately the same size. For example, the wireless node 802 may divide the sensing resources by two, and may use $$\left\lfloor \frac{N}{x} \right\rfloor$$

sensing resources, eliminating one sensing resource if the total number is odd, or may use $$\left\lceil \frac{N}{x} \right\rceil$$

sensing resources, adding a common sensing resource if the total number is odd. At 830, the wireless node 802 may perform sensing on both sub-CPI intervals. The wireless node 802 (at 836) or the sensing entity 806 (at 838) may perform hypothesis testing on which interval contains, or does not contain, a phase coherence indication event, and use the results of the interval that has a higher probability of not containing the phase coherence indication event.

In one example, an initial set of an initial set of 10 sensing signals may be received by the wireless node 802, which, at 830, are divided into 2 resource sets, each of size 5. The wireless node 802 may estimate a first Doppler spectrum on the first 5 resources, and a second Doppler spectrum on the second set of 5 resources. The wireless node 802 may report both to the sensing entity as the sensing measurement report 834. The sensing entity 806 may have access to a Doppler spectrum evaluated from different transmissions (e.g., from another TRP, where coherence was not lost). At 838, the sensing entity 806 may compare whether the first or the second Doppler spectrum is in line with the third Doppler spectrum. The sensing entity 806 may also average the third Doppler spectrum with the Doppler spectrum that is more in line with the third Doppler spectrum.

At 820, the wireless node 804 may initiate a transmission of a continuous set of sub-CPI as the set of sensing signals 822. The length of the continuous set of sub-CPI sensing signals may be indicated by the sub-CPI configuration 818. The wireless node 804 may be configured to continue transmitting sensing signals until at least the number of configured coherent resources are transmitted. For example, at 826, when the wireless node 804 detects a discontinuity, the wireless node 804 may initiate another continuous set of sub-CPI at 820. The wireless node 804 may be configured to transmit the continuous set of sub-CPI a second threshold number of times. The second threshold number of times may be indicated by the sub-CPI configuration 818. If the wireless node 804 fails to transmit the continuous set of sub-CPI the second threshold number of times, the wireless node 804 may drop transmissions of the set of sensing signals 822 until the next set of transmissions.

The wireless node 804 may transmit an indication to the wireless node 802 of the extra transmissions. In one aspect, the wireless node 804 may transmit a fast indication (e.g., using level 1 or level 2 signaling) of a phase discontinuity to the wireless node 802 as the phase coherence indication 828. In response to receiving the phase coherence indication 828, the wireless node 802 may anticipate additional sensing signals. In some aspects, the wireless node 804 may be configured to reserve extra transmissions to allow for the desired minimum length for the sub-CPI to be transmitted by the wireless node 804, and may release any reserved extra transmissions if the wireless node 804 ends up not using any of the reserved extra transmissions.

Once the wireless node 804 transmits the threshold number of continuous phase coherent sensing signals, at 830, the wireless node 802 may perform sensing on the reflected set of sensing signals 824. At 826, the wireless node 804 may detect another discontinuity before the wireless node 804 transmits the threshold number of continuous phase coherent sensing signals, and, in response, may, again, initiate a continuous set of sub-CPI at 820. The wireless node 804 may continue to attempt to transmit the threshold number of continuous phase coherent sensing signals a second threshold number of times, and may drop all sensing transmissions if the wireless node 804 fails to transmit the threshold number of continuous phase coherent sensing signals the second threshold number of times.

The wireless node 802 may transmit a sensing measurement report 832 to the wireless node 804. At 836, the wireless node 804 may process the sensing measurement report 832. The wireless node 802 may transmit a sensing measurement report 834 to the sensing entity 806. At 838, the sensing entity 806 may process the sensing measurement report 834. The sensing measurement report 832 or the sensing measurement report 834 may include the length of the coherent interval used for processing. At 838, the sensing entity 806 may use the length of the coherent interval to fuse different sensing outputs from different sensing nodes. For example, the length of the coherent interval may be used to weight a first sensing measurement from a first wireless node with a second sensing measurement from a second wireless node. In some aspects, the sensing measurement report 832 or the sensing measurement report 834 may include a weighted average length if multiple coherent sub-CPI outputs are non-coherently combined.

Figure 9:
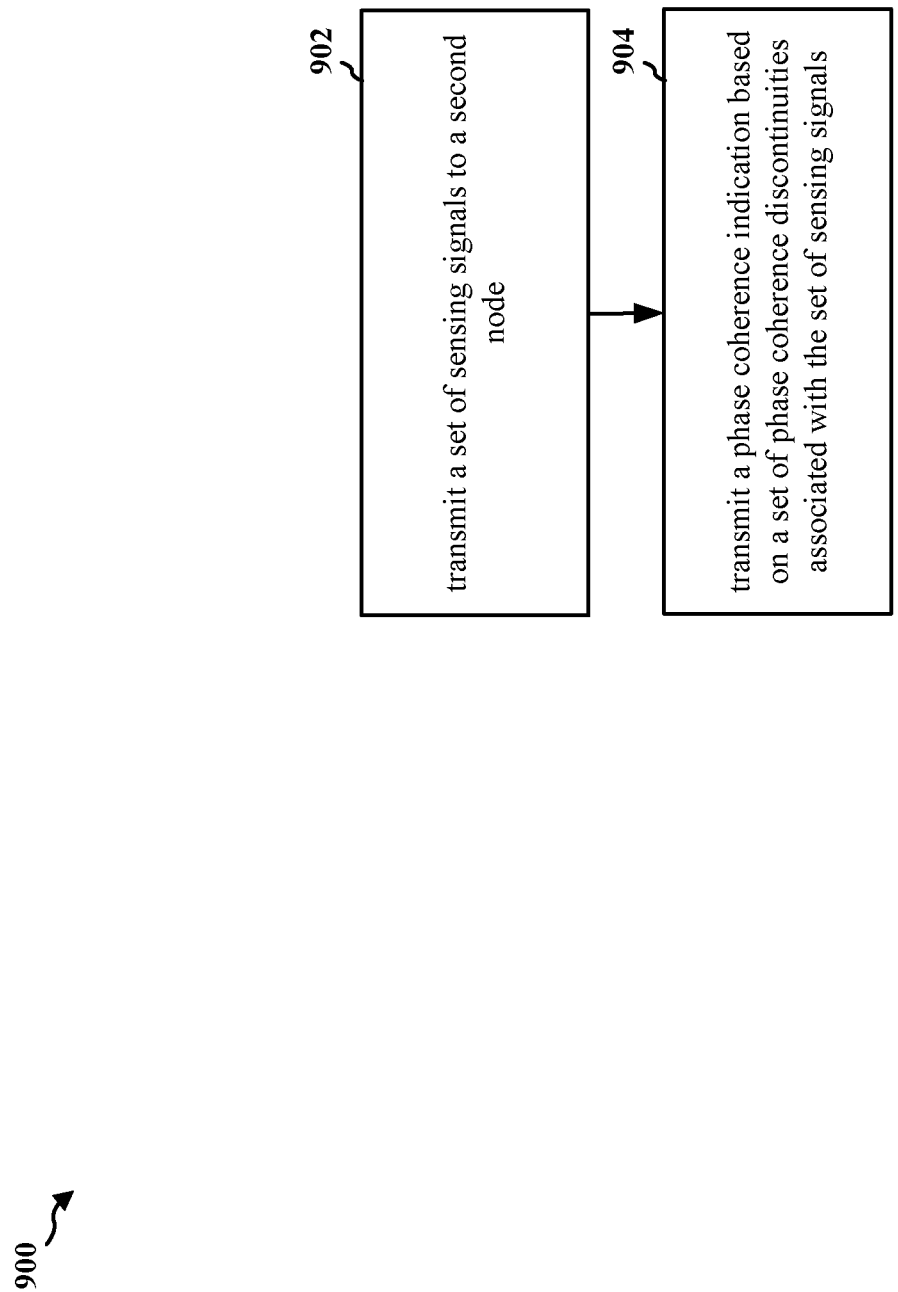
FIG. 9 is a flowchart of a method of wireless communication.

FIG. 9 is a flowchart 900 of a method of wireless communication. The method may be performed by a first node (e.g., the UE 104, the UE 350, the UE 404; the base station 102, the base station 310; the TRP 402, the TRP 406; the wireless node 502, the wireless node 504, the wireless node 506, the wireless node 508, the wireless node 610, the wireless node 804; the apparatus 1604; the network entity 1602, the network entity 1702, the network entity 1860). At 902, the first node may transmit a set of sensing signals. For example, 902 may be performed by the wireless node 804 in FIG. 8, which may transmit the set of sensing signals 810. Moreover, 902 may be performed by the component 198 in FIG. 1, 3, 16, 17, or 18.

At 904, the first node may transmit a phase coherence indication based on a set of phase coherence discontinuities associated with the set of sensing signals to a second node. For example, 904 may be performed by the wireless node 804 in FIG. 8, which may transmit the phase coherence indication 816 to the wireless node 802 based on the set of phase coherence discontinuities, detected at 814, associated with the set of sensing signals 810. Moreover, 904 may be performed by the component 198 in FIG. 1, 3, 16, 17, or 18.

Figure 10:
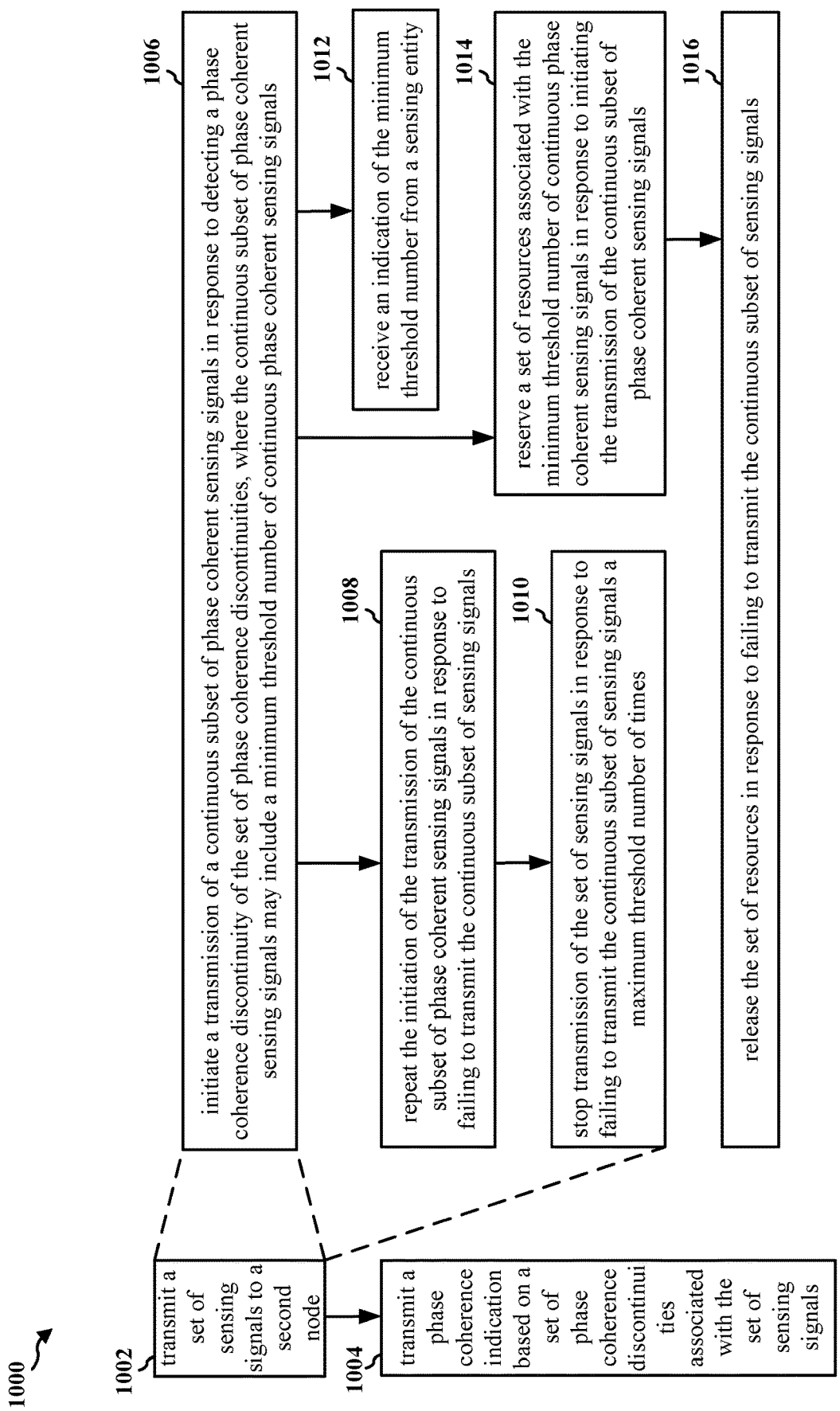
FIG. 10 is a flowchart of a method of wireless communication.

FIG. 10 is a flowchart 1000 of a method of wireless communication. The method may be performed by a first node (e.g., the UE 104, the UE 350, the UE 404; the base station 102, the base station 310; the TRP 402, the TRP 406; the wireless node 502, the wireless node 504, the wireless node 506, the wireless node 508, the wireless node 610, the wireless node 804; the apparatus 1604; the network entity 1602, the network entity 1702, the network entity 1860). At 1002, the first node may transmit a set of sensing signals. For example, 1002 may be performed by the wireless node 804 in FIG. 8, which may transmit the set of sensing signals 810. Moreover, 1002 may be performed by the component 198 in FIG. 1, 3, 16, 17, or 18.

At 1004, the first node may transmit a phase coherence indication based on a set of phase coherence discontinuities associated with the set of sensing signals to a second node. For example, 1004 may be performed by the wireless node 804 in FIG. 8, which may transmit the phase coherence indication 816 to the wireless node 802 based on the set of phase coherence discontinuities, detected at 814, associated with the set of sensing signals 810. Moreover, 1004 may be performed by the component 198 in FIG. 1, 3, 16, 17, or 18.

At 1006, the first node may initiate a transmission of a continuous subset of phase coherent sensing signals in response to detecting a phase coherence discontinuity of the set of phase coherence discontinuities. The continuous subset of phase coherent sensing signals may include a minimum threshold number of continuous phase coherent sensing signals. For example, 1006 may be performed by the wireless node 804 in FIG. 8, which may, at 820, initiate a transmission of a continuous subset of phase coherent sensing signals as the set of sensing signals 822 in response to detecting, at 814, a phase coherence discontinuity of the set of phase coherence discontinuities. The continuous subset of phase coherent sensing signals may include a minimum threshold number of continuous phase coherent sensing signals as defined by the sub-CPI configuration 818. Moreover, 1006 may be performed by the component 198 in FIG. 1, 3, 16, 17, or 18.

At 1008, the first node may repeat the initiation of the transmission of the continuous subset of phase coherent sensing signals in response to failing to transmit the continuous subset of sensing signals. For example, 1008 may be performed by the wireless node 804 in FIG. 8, which may, at 820, repeat the initiation of the transmission of the continuous subset of phase coherent sensing signals in response to failing to transmit the continuous subset of sensing signals at 826. Moreover, 1008 may be performed by the component 198 in FIG. 1, 3, 16, 17, or 18.

At 1010, the first node may stop transmission of the set of sensing signals in response to failing to transmit the continuous subset of sensing signals a maximum threshold number of times. For example, 1010 may be performed by the wireless node 804 in FIG. 8, which may stop transmission of the set of sensing signals 822 in response to failing to transmit the continuous subset of sensing signals a maximum threshold number of times. Moreover, 1010 may be performed by the component 198 in FIG. 1, 3, 16, 17, or 18.

At 1012, the first node may receive an indication of the minimum threshold number from a sensing entity. For example, 1012 may be performed by the wireless node 804 in FIG. 8, which may receive an indication of the minimum threshold number in the sub-CPI configuration 818 from the sensing entity 806. Moreover, 1012 may be performed by the component 198 in FIG. 1, 3, 16, 17, or 18.

At 1014, the first node may reserve a set of resources associated with the minimum threshold number of continuous phase coherent sensing signals in response to initiating the transmission of the continuous subset of phase coherent sensing signals. For example, 1014 may be performed by the wireless node 804 in FIG. 8, which may, at 820, reserve a set of resources associated with the minimum threshold number of continuous phase coherent sensing signals in response to initiating the transmission of the continuous subset of phase coherent sensing signals. Moreover, 1014 may be performed by the component 198 in FIG. 1, 3, 16, 17, or 18.

At 1016, the first node may release the set of resources in response to failing to transmit the continuous subset of sensing signals. For example, 1016 may be performed by the wireless node 804 in FIG. 8, which may, at 826, release the set of resources in response to failing to transmit the continuous subset of sensing signals. Moreover, 1016 may be performed by the component 198 in FIG. 1, 3, 16, 17, or 18.

Figure 11:
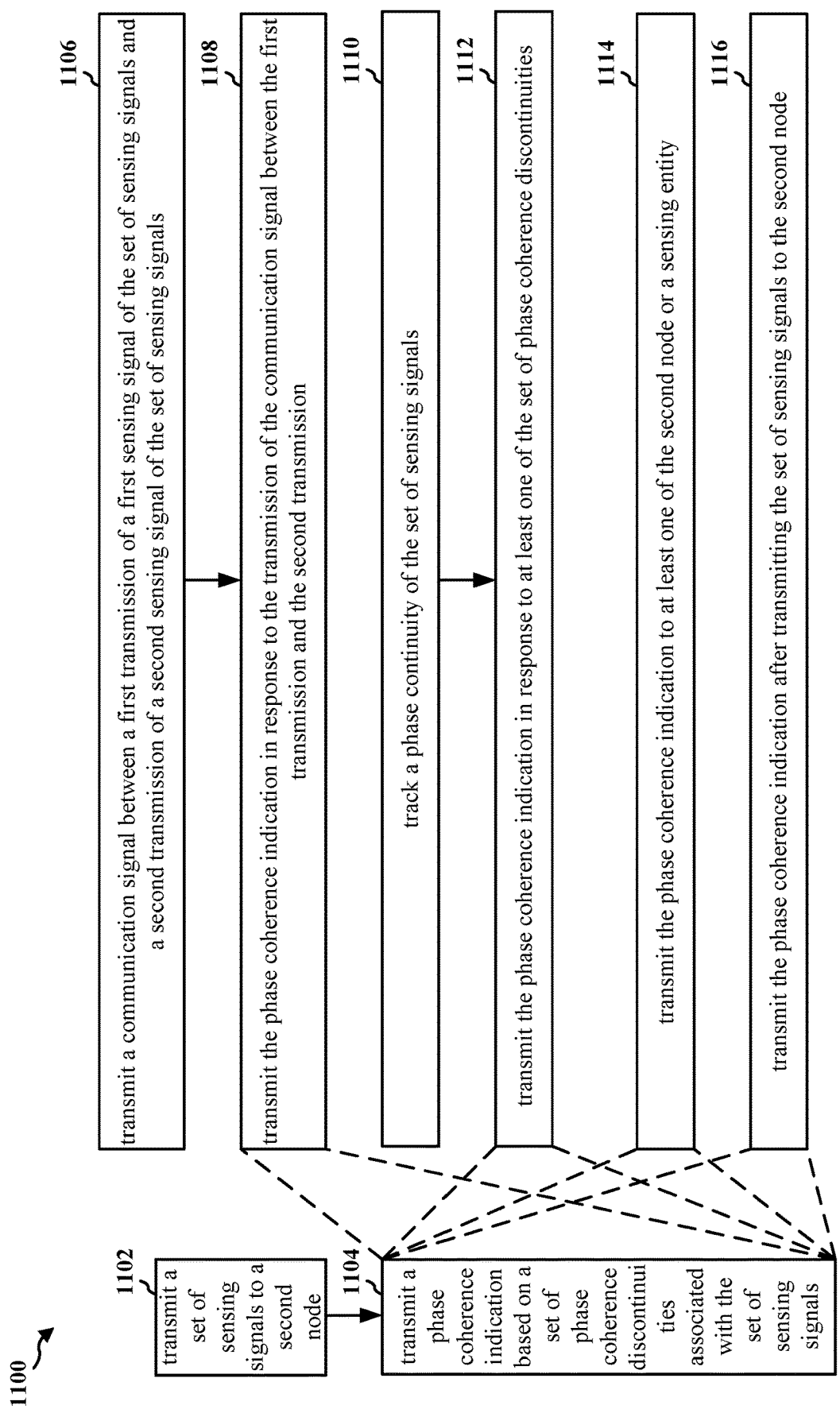
FIG. 11 is a flowchart of a method of wireless communication.

FIG. 11 is a flowchart 1100 of a method of wireless communication. The method may be performed by a first node (e.g., the UE 104, the UE 350, the UE 404; the base station 102, the base station 310; the TRP 402, the TRP 406; the wireless node 502, the wireless node 504, the wireless node 506, the wireless node 508, the wireless node 610, the wireless node 804; the apparatus 1604; the network entity 1602, the network entity 1702, the network entity 1860). At 1102, the first node may transmit a set of sensing signals. For example, 1102 may be performed by the wireless node 804 in FIG. 8, which may transmit the set of sensing signals 810. Moreover, 1102 may be performed by the component 198 in FIG. 1, 3, 16, 17, or 18.

At 1104, the first node may transmit a phase coherence indication based on a set of phase coherence discontinuities associated with the set of sensing signals to a second node. For example, 1104 may be performed by the wireless node 804 in FIG. 8, which may transmit the phase coherence indication 816 to the wireless node 802 based on the set of phase coherence discontinuities, detected at 814, associated with the set of sensing signals 810. Moreover, 1104 may be performed by the component 198 in FIG. 1, 3, 16, 17, or 18.

At 1106, the first node may transmit a communication signal between a first transmission of a first sensing signal of the set of sensing signals and a second transmission of a second sensing signal of the set of sensing signals. For example, 1106 may be performed by the wireless node 804 in FIG. 8, which may transmit a communication signal between a first transmission of a first sensing signal of the set of sensing signals 810 and a second transmission of a second sensing signal of the set of sensing signals 810. The communication signal may be detected at 814 as a discontinuity of the set of sensing signals 810. Moreover, 1106 may be performed by the component 198 in FIG. 1, 3, 16, 17, or 18.

At 1108, the first node may transmit the phase coherence indication in response to the transmission of the communication signal between the first transmission and the second transmission. For example, 1108 may be performed by the wireless node 804 in FIG. 8, which may transmit the phase coherence indication 816 in response to the transmission of the communication signal between the first transmission and the second transmission detected at 814. Moreover, 1108 may be performed by the component 198 in FIG. 1, 3, 16, 17, or 18.

At 1110, the first node may track a phase continuity of the set of sensing signals. For example, 1110 may be performed by the wireless node 804 in FIG. 8, which may track a phase continuity of the set of sensing signals by detecting discontinuities at 814. Moreover, 1110 may be performed by the component 198 in FIG. 1, 3, 16, 17, or 18.

At 1112, the first node may transmit the phase coherence indication in response to at least one of the set of phase coherence discontinuities. For example, 1112 may be performed by the wireless node 804 in FIG. 8, which may transmit the phase coherence indication 816 in response to at least one of the set of phase coherence discontinuities detected at 814. Moreover, 1112 may be performed by the component 198 in FIG. 1, 3, 16, 17, or 18.

At 1114, the first node may transmit the phase coherence indication to at least one of the second node or a sensing entity. For example, 1114 may be performed by the wireless node 804 in FIG. 8, which may transmit the phase coherence indication 816 to at least one of the wireless node 802 or the sensing entity 806. Moreover, 1114 may be performed by the component 198 in FIG. 1, 3, 16, 17, or 18.

At 1116, the first node may transmit the phase coherence indication after transmitting the set of sensing signals to the second node. For example, 1116 may be performed by the wireless node 804 in FIG. 8, which may transmit the phase coherence indication 816 after transmitting the set of sensing signals 810. Moreover, 1116 may be performed by the component 198 in FIG. 1, 3, 16, 17, or 18.

Figure 12:
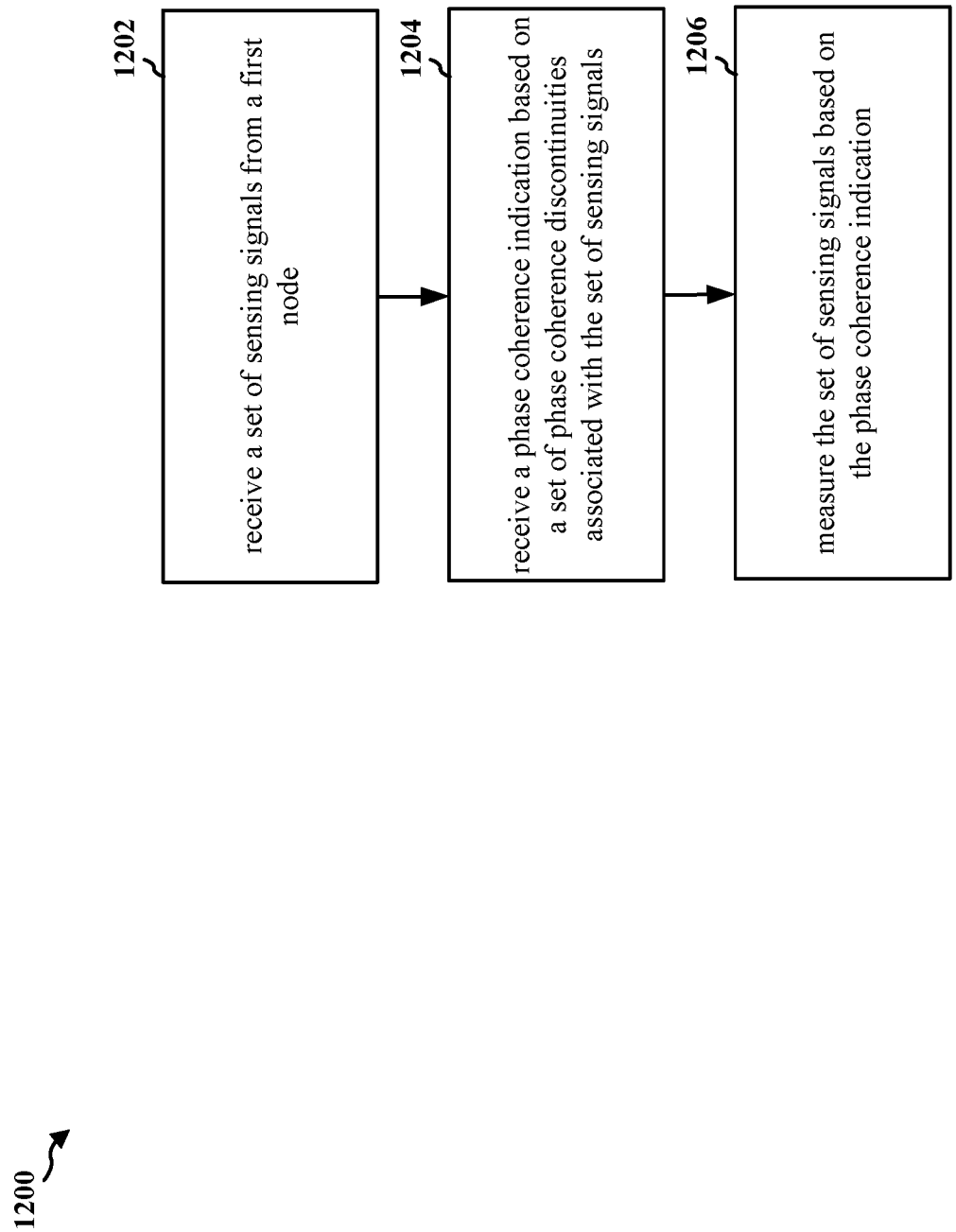
FIG. 12 is a flowchart of a method of wireless communication.

FIG. 12 is a flowchart 1200 of a method of wireless communication. The method may be performed by a second node (e.g., the UE 104, the UE 350, the UE 404; the base station 102, the base station 310; the TRP 402, the TRP 406; the wireless node 502, the wireless node 504, the wireless node 506, the wireless node 508, the wireless node 802; the apparatus 1604; the network entity 1602, the network entity 1702, the network entity 1860). At 1202, the second node may receive a set of sensing signals. For example, 1202 may be performed by the wireless node 802 in FIG. 8, which may receive the reflected set of sensing signals 812 from the wireless node 804, reflected off of the target object 803. Moreover, 1202 may be performed by the component 199 in FIG. 1, 3, 16, 17, or 18.

At 1204, the second node may receive a phase coherence indication based on a set of phase coherence discontinuities associated with the set of sensing signals from a first node. For example, 1204 may be performed by the wireless node 804 in FIG. 8, which may receive the phase coherence indication 816 from the wireless node 804 based on a set of phase coherence discontinuities, detected at 814, associated with the set of sensing signals 810. Moreover, 1204 may be performed by the component 199 in FIG. 1, 3, 16, 17, or 18.

At 1206, the second node may measure the set of sensing signals based on the phase coherence indication. For example, 1206 may be performed by the wireless node 802 in FIG. 8, which may measure the reflected set of sensing signals 812 or the reflected set of sensing signals 824 based on the phase coherence indication 816. Moreover, 1206 may be performed by the component 199 in FIG. 1, 3, 16, 17, or 18.

Figure 13:
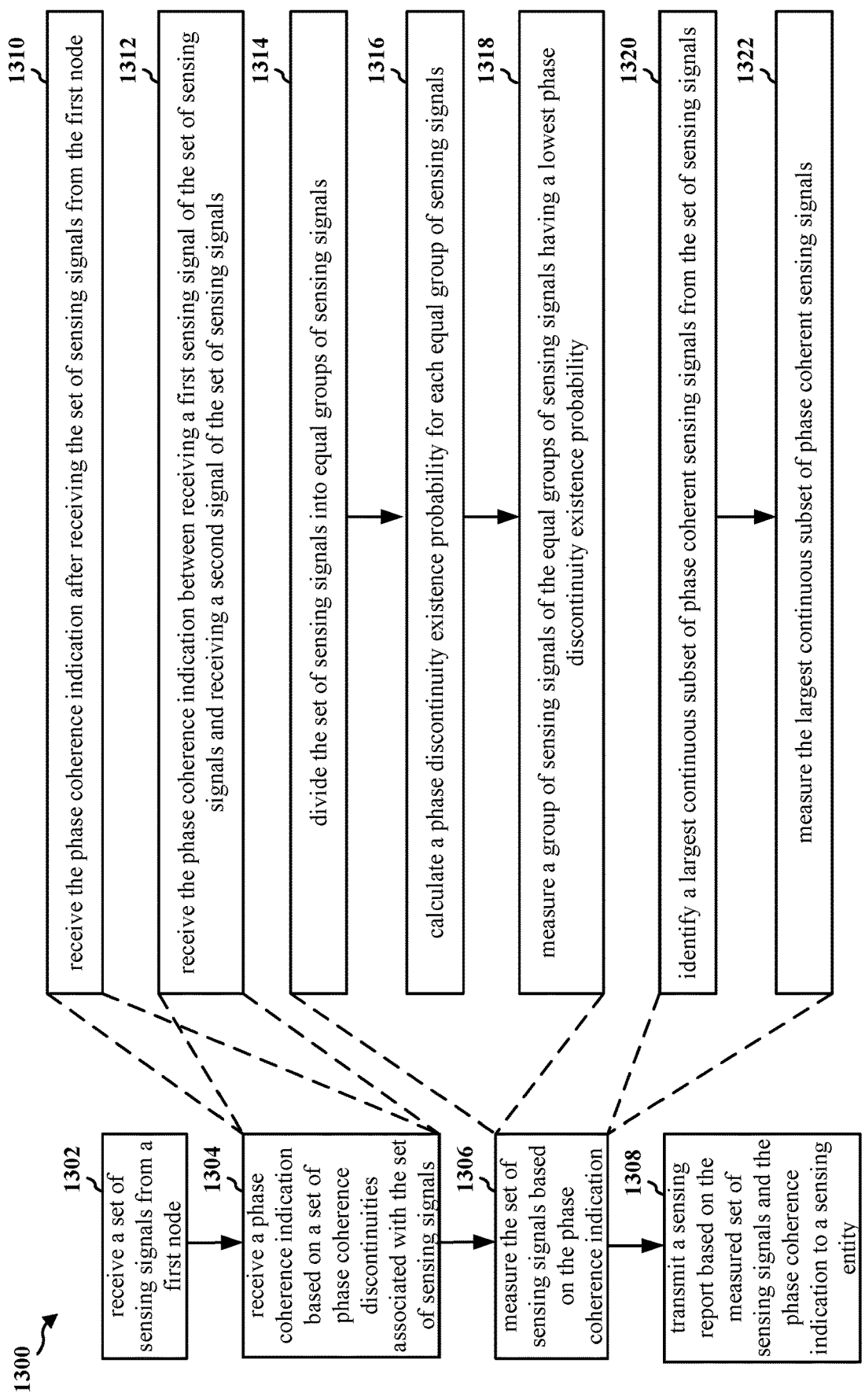
FIG. 13 is a flowchart of a method of wireless communication.

FIG. 13 is a flowchart 1300 of a method of wireless communication. The method may be performed by a second node (e.g., the UE 104, the UE 350, the UE 404; the base station 102, the base station 310; the TRP 402, the TRP 406; the wireless node 502, the wireless node 504, the wireless node 506, the wireless node 508, the wireless node 802; the apparatus 1604; the network entity 1602, the network entity 1702, the network entity 1860). At 1302, the second node may receive a set of sensing signals. For example, 1302 may be performed by the wireless node 802 in FIG. 8, which may receive the reflected set of sensing signals 812 from the wireless node 804, reflected off of the target object 803. Moreover, 1302 may be performed by the component 199 in FIG. 1, 3, 16, 17, or 18.

At 1304, the second node may receive a phase coherence indication based on a set of phase coherence discontinuities associated with the set of sensing signals from a first node. For example, 1304 may be performed by the wireless node 804 in FIG. 8, which may receive the phase coherence indication 816 from the wireless node 804 based on a set of phase coherence discontinuities, detected at 814, associated with the set of sensing signals 810. Moreover, 1304 may be performed by the component 199 in FIG. 1, 3, 16, 17, or 18.

At 1306, the second node may measure the set of sensing signals based on the phase coherence indication. For example, 1306 may be performed by the wireless node 802 in FIG. 8, which may measure the reflected set of sensing signals 812 or the reflected set of sensing signals 824 based on the phase coherence indication 816. Moreover, 1306 may be performed by the component 199 in FIG. 1, 3, 16, 17, or 18.

At 1308, the second node may transmit a sensing report based on the measured set of sensing signals and the phase coherence indication to a sensing entity. For example, 1308 may be performed by the wireless node 802 in FIG. 8, which may transmit the sensing measurement report 834 based on the measured set of sensing signals at 830 and the phase coherence indication 816 or the phase coherence indication 828 to the sensing entity 806. Moreover, 1308 may be performed by the component 199 in FIG. 1, 3, 16, 17, or 18.

At 1310, the second node may receive the phase coherence indication after receiving the set of sensing signals from the first node. For example, 1310 may be performed by the wireless node 802 in FIG. 8, which may receive the phase coherence indication 816 after receiving the reflected set of sensing signals 812. Moreover, 1310 may be performed by the component 199 in FIG. 1, 3, 16, 17, or 18.

At 1312, the second node may receive the phase coherence indication between receiving a first sensing signal of the set of sensing signals and receiving a second signal of the set of sensing signals. For example, 1312 may be performed by the wireless node 802 in FIG. 8, which may receive the phase coherence indication 816 from the wireless node 804 between receiving a first sensing signal of the set of sensing signals 810 and receiving a second signal of the set of sensing signals 822. Moreover, 1312 may be performed by the component 199 in FIG. 1, 3, 16, 17, or 18.

At 1314, the second node may divide the set of sensing signals into equal groups of sensing signals. For example, 1314 may be performed by the wireless node 802 in FIG. 8, which may, at 830, divide the set of sensing signals 810 into equal groups of sensing signals. Moreover, 1314 may be performed by the component 199 in FIG. 1, 3, 16, 17, or 18.

At 1316, the second node may calculate a phase discontinuity existence probability for each equal group of sensing signals. For example, 1316 may be performed by the wireless node 802 in FIG. 8, which may, at 830, calculate a phase discontinuity existence probability for each equal group of sensing signals. Moreover, 1316 may be performed by the component 199 in FIG. 1, 3, 16, 17, or 18.

At 1318, the second node may measure a group of sensing signals of the equal groups of sensing signals having a lowest phase discontinuity existence probability. For example, 1318 may be performed by the wireless node 802 in FIG. 8, which may, at 830, measure a group of sensing signals of the equal groups of sensing signals having a lowest phase discontinuity existence probability. Moreover, 1318 may be performed by the component 199 in FIG. 1, 3, 16, 17, or 18.

At 1320, the second node may identify a largest continuous subset of phase coherent sensing signals from the set of sensing signals. For example, 1320 may be performed by the wireless node 802 in FIG. 8, which may identify a largest continuous subset of phase coherent sensing signals from the set of sensing signals 810 or the set of sensing signals 822. Moreover, 1320 may be performed by the component 199 in FIG. 1, 3, 16, 17, or 18.

At 1322, the second node may measure the largest continuous subset of phase coherent sensing signals. For example, 1322 may be performed by the wireless node 802 in FIG. 8, which may measure the largest continuous subset of phase coherent sensing signals from the set of sensing signals 810 or the set of sensing signals 822. Moreover, 1322 may be performed by the component 199 in FIG. 1, 3, 16, 17, or 18.

Figure 14:
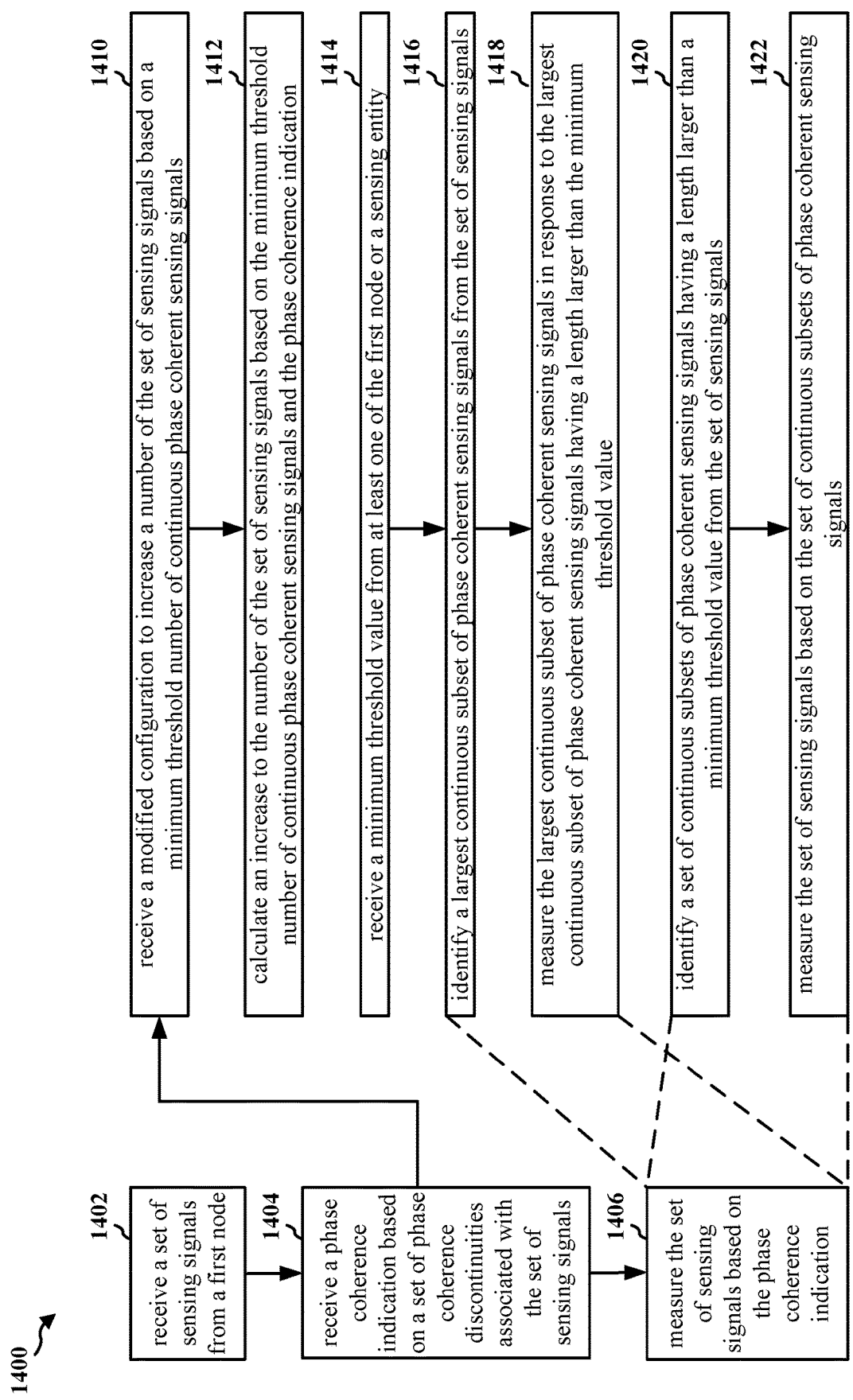
FIG. 14 is a flowchart of a method of wireless communication.

FIG. 14 is a flowchart 1400 of a method of wireless communication. The method may be performed by a second node (e.g., the UE 104, the UE 350, the UE 404; the base station 102, the base station 310; the TRP 402, the TRP 406; the wireless node 502, the wireless node 504, the wireless node 506, the wireless node 508, the wireless node 802; the apparatus 1604; the network entity 1602, the network entity 1702, the network entity 1860). At 1402, the second node may receive a set of sensing signals. For example, 1402 may be performed by the wireless node 802 in FIG. 8, which may receive the reflected set of sensing signals 812 from the wireless node 804, reflected off of the target object 803. Moreover, 1402 may be performed by the component 199 in FIG. 1, 3, 16, 17, or 18.

At 1404, the second node may receive a phase coherence indication based on a set of phase coherence discontinuities associated with the set of sensing signals from a first node. For example, 1404 may be performed by the wireless node 804 in FIG. 8, which may receive the phase coherence indication 816 from the wireless node 804 based on a set of phase coherence discontinuities, detected at 814, associated with the set of sensing signals 810. Moreover, 1404 may be performed by the component 199 in FIG. 1, 3, 16, 17, or 18.

At 1406, the second node may measure the set of sensing signals based on the phase coherence indication. For example, 1406 may be performed by the wireless node 802 in FIG. 8, which may measure the reflected set of sensing signals 812 or the reflected set of sensing signals 824 based on the phase coherence indication 816. Moreover, 1406 may be performed by the component 199 in FIG. 1, 3, 16, 17, or 18.

At 1410, the second node may receive a modified configuration to increase a number of the set of sensing signals based on a minimum threshold number of continuous phase coherent sensing signals. For example, 1410 may be performed by the wireless node 802 in FIG. 8, which may receive a modified configuration as the sub-CPI configuration 818 to increase a number of the set of sensing signals based on a minimum threshold number of continuous phase coherent sensing signals. Moreover, 1410 may be performed by the component 199 in FIG. 1, 3, 16, 17, or 18.

At 1412, the second node may calculate an increase to the number of the set of sensing signals based on the minimum threshold number of continuous phase coherent sensing signals and the phase coherence indication. For example, 1412 may be performed by the wireless node 802 in FIG. 8, which may, at 820, calculate an increase to the number of the set of sensing signals based on the minimum threshold number of continuous phase coherent sensing signals and the phase coherence indication 816. Moreover, 1412 may be performed by the component 199 in FIG. 1, 3, 16, 17, or 18.

At 1414, the second node may receive a minimum threshold value from at least one of the first node or a sensing entity. For example, 1414 may be performed by the wireless node 802 in FIG. 8, which may receive a minimum threshold value as the sub-CPI configuration 818 from at least one of the wireless node 804 or the sensing entity 806. Moreover, 1414 may be performed by the component 199 in FIG. 1, 3, 16, 17, or 18.

At 1416, the second node may identify a largest continuous subset of phase coherent sensing signals from the set of sensing signals. For example, 1416 may be performed by the wireless node 802 in FIG. 8, which may identify a largest continuous subset of phase coherent sensing signals from the set of sensing signals 810 or the set of sensing signals 822. Moreover, 1416 may be performed by the component 199 in FIG. 1, 3, 16, 17, or 18.

At 1418, the second node may measure the largest continuous subset of phase coherent sensing signals in response to the largest continuous subset of phase coherent sensing signals having a length larger than the minimum threshold value. For example, 1418 may be performed by the wireless node 802 in FIG. 8, which may, at 830, measure the largest continuous subset of phase coherent sensing signals in response to the largest continuous subset of phase coherent sensing signals having a length larger than the minimum threshold value. Moreover, 1418 may be performed by the component 199 in FIG. 1, 3, 16, 17, or 18.

At 1420, the second node may identify a set of continuous subsets of phase coherent sensing signals having a length larger than a minimum threshold value from the set of sensing signals. For example, 1420 may be performed by the wireless node 802 in FIG. 8, which may, at 830, identify a set of continuous subsets of phase coherent sensing signals having a length larger than a minimum threshold value from the set of sensing signals. Moreover, 1420 may be performed by the component 199 in FIG. 1, 3, 16, 17, or 18.

At 1422, the second node may measure the set of sensing signals based on the set of continuous subsets of phase coherent sensing signals. For example, 1422 may be performed by the wireless node 802 in FIG. 8, which may, at 830, measure the set of sensing signals based on the set of continuous subsets of phase coherent sensing signals. Moreover, 1422 may be performed by the component 199 in FIG. 1, 3, 16, 17, or 18.

Figure 15:
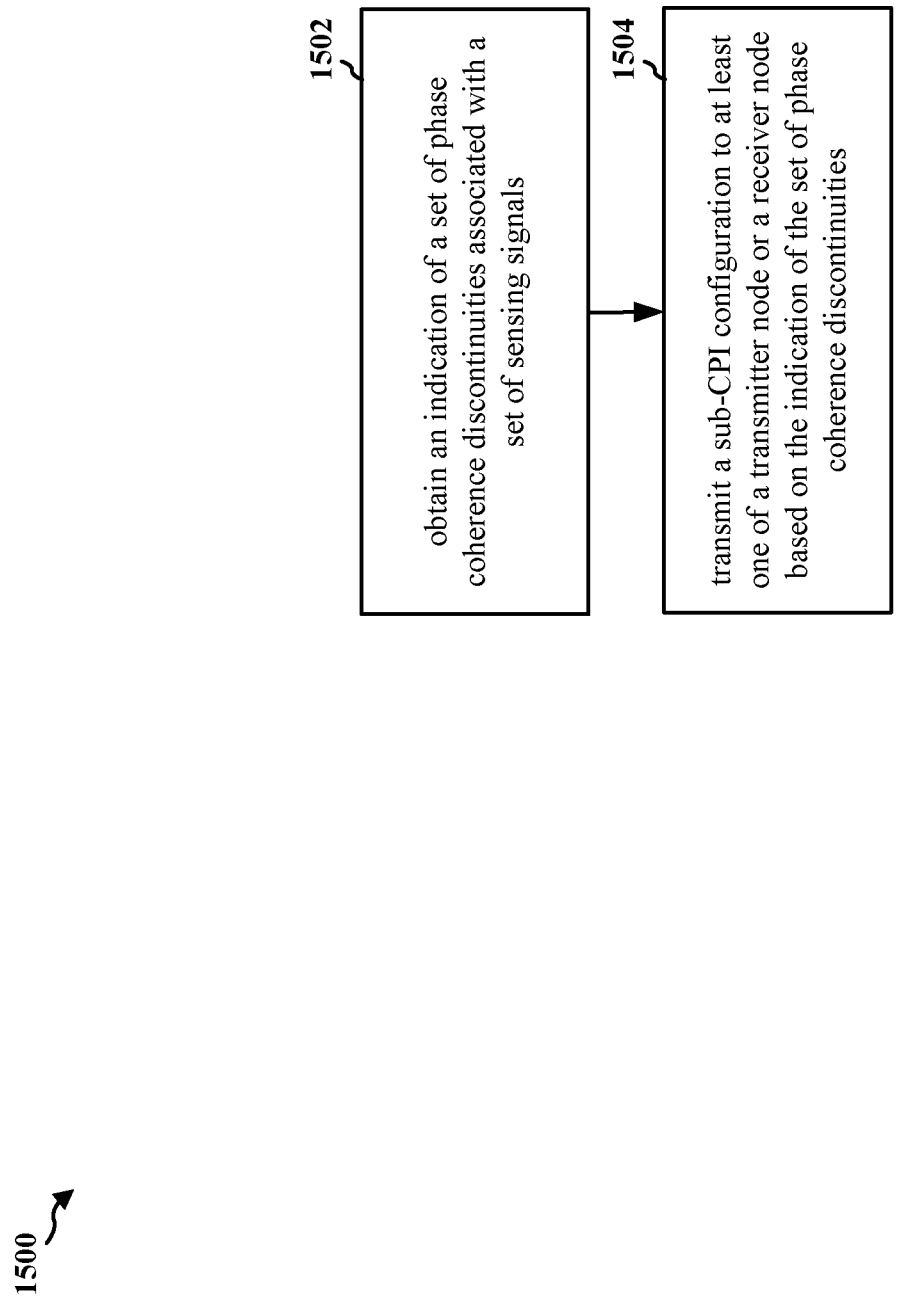
FIG. 15 is a flowchart of a method of wireless communication.

FIG. 15 is a flowchart 1500 of a method of wireless communication. The method may be performed by a sensing entity (e.g., the base station 102, the base station 310; the TRP 402, the TRP 406; the wireless node 502, the wireless node 504, the wireless node 506, the wireless node 508, the sensing entity 806; the network entity 1602, the network entity 1702, the network entity 1860). At 1502, the first node may obtain an indication of a set of phase coherence discontinuities associated with a set of sensing signals. For example, 1502 may be performed by the sensing entity 806 in FIG. 8, which may obtain the phase coherence indication 816 of a set of phase coherence discontinuities associated with the set of sensing signals 810. Moreover, 1502 may be performed by the component 197 in FIG. 1, 3, 17, or 18.

At 1504, the first node may transmit a sub-CPI configuration to at least one of a transmitter node or a receiver node based on the indication of the set of phase coherence discontinuities. For example, 1504 may be performed by the sensing entity 806 in FIG. 8, which may transmit a sub-CPI configuration 818 to the wireless node 804 or to the wireless node 802 based on the phase coherence indication 816 of the set of phase coherence discontinuities. Moreover, 1504 may be performed by the component 197 in FIG. 1, 3, 17, or 18.

Figure 16:
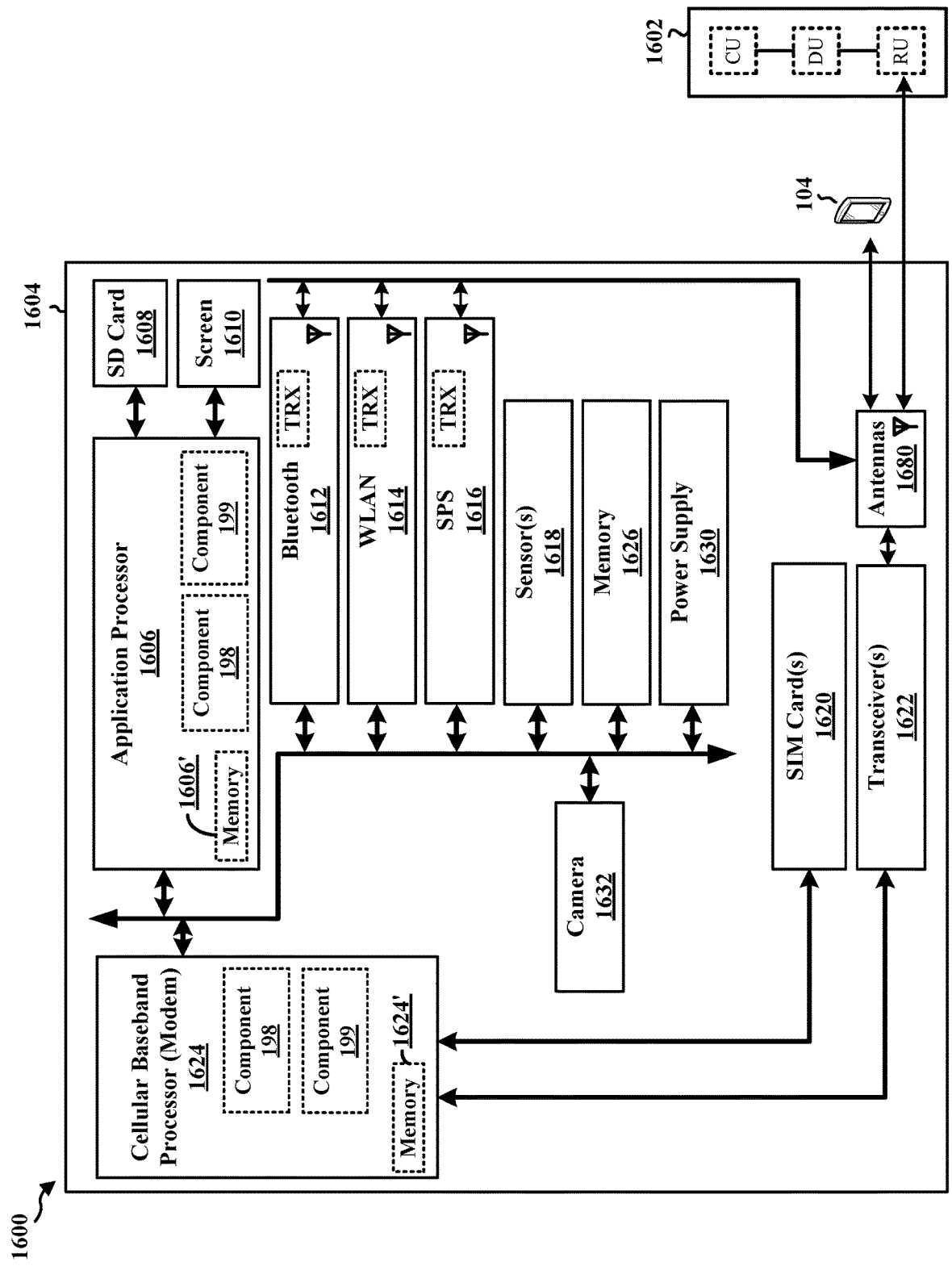
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1204 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (Rx)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the Tx processor 368, the Rx processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., sec UE 350 of FIG. 3) and include the additional modules of the apparatus 1604.

As discussed supra, the component 198 may be configured to transmit a set of sensing signals. The component 198 may be configured to transmit a phase coherence indication based on a set of phase coherence discontinuities associated with the set of sensing signals to a second node. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, may include means for transmitting a set of sensing signals. The apparatus 1604 may include means for transmitting a phase coherence indication based on a set of phase coherence discontinuities associated with the set of sensing signals to a second node. The apparatus 1604 may include means for transmitting a communication signal between a first transmission of a first sensing signal of the set of sensing signals and a second transmission of a second sensing signal of the set of sensing signals. The apparatus 1604 may include means for transmitting the phase coherence indication by transmitting the phase coherence indication in response to the transmission of the communication signal between the first transmission and the second transmission. The apparatus 1604 may include means for tracking a phase continuity of the set of sensing signals. The apparatus 1604 may include means for transmitting the phase coherence indication by transmitting the phase coherence indication in response to detecting at least one of the set of phase coherence discontinuities. The apparatus 1604 may include one of a TRP, a UE, a sensing reference unit, or a positioning reference unit. The set of sensing signals may include a PRS or an SRS. The apparatus 1604 may include means for transmitting the phase coherence indication by transmitting the phase coherence indication to at least one of the second node or a sensing entity. The apparatus 1604 may include means for transmitting the phase coherence indication by transmitting the phase coherence indication after transmitting the set of sensing signals. The phase coherence indication may include a binary indication of an existence or an absence of a phase coherence discontinuity associated with the set of sensing signals. The phase coherence indication may include a total number of the set of phase coherence discontinuities associated with the set of sensing signals. The phase coherence indication may include a set of position indications associated with the set of sensing signals. Each of the set of phase coherence discontinuities may correspond to one of the set of position indications. The set of position indications may include a timestamp or a sensing signal identifier. The apparatus 1604 may include means for transmitting the set of sensing signals by initiating a transmission of a continuous subset of phase coherent sensing signals in response to detecting a phase coherence discontinuity of the set of phase coherence discontinuities. The continuous subset of phase coherent sensing signals may include a minimum threshold number of continuous phase coherent sensing signals. The apparatus 1604 may include means for receiving an indication of the minimum threshold number from a sensing entity. The apparatus 1604 may include means for transmitting the set of sensing signals by repeating the initiation of the transmission of the continuous subset of phase coherent sensing signals in response to failing to transmit the continuous subset of sensing signals. The apparatus 1604 may include means for transmitting the set of sensing signals by stopping transmission of the set of sensing signals in response to failing to transmit the continuous subset of sensing signals a maximum threshold number of times. The apparatus 1604 may include means for reserving a set of resources associated with the minimum threshold number of continuous phase coherent sensing signals in response to initiating the transmission of the continuous subset of phase coherent sensing signals. The apparatus 1604 may include means for releasing the set of resources in response to failing to transmit the continuous subset of sensing signals. The means may be the component 198 of the apparatus 1604 configured to perform the functions recited by the means. As described supra, the apparatus 1604 may include the Tx processor 368, the Rx processor 356, and the controller/processor 359. As such, in one configuration, the means may be the Tx processor 368, the Rx processor 356, and/or the controller/processor 359 configured to perform the functions recited by the means.

As discussed supra, the component 199 may be configured to receive a set of sensing signals. The component 199 may be configured to receive a phase coherence indication based on a set of phase coherence discontinuities associated with the set of sensing signals from a first node. The component 199 may be configured to measure the set of sensing signals based on the phase coherence indication. The component 199 may be within the cellular baseband processor 1624, the application processor 1606, or both the cellular baseband processor 1624 and the application processor 1606. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, may include means for receiving a set of sensing signals from a first node. The apparatus 1604 may include means for receiving a phase coherence indication based on a set of phase coherence discontinuities associated with the set of sensing signals. The apparatus 1604 may include means for measuring the set of sensing signals based on the phase coherence indication. The apparatus 1604 may include one of a TRP, a UE, a sensing reference unit, or a positioning reference unit. The set of sensing signals may include a PRS or an SRS. The apparatus 1604 may include means for receiving the phase coherence indication by receiving the phase coherence indication after receiving the set of sensing signals. The apparatus 1604 may include means for receiving the phase coherence indication by receiving the phase coherence indication between receiving a first sensing signal of the set of sensing signals and receiving a second signal of the set of sensing signals. The phase coherence indication may include a binary indication of an existence or an absence of a phase coherence discontinuity associated with the set of sensing signals. The apparatus 1604 may include means for measuring the set of sensing signals based on the phase coherence indication by dividing the set of sensing signals into equal groups of sensing signals. The apparatus 1604 may include means for measuring the set of sensing signals based on the phase coherence indication by calculating a phase discontinuity existence probability for each equal group of sensing signals. The apparatus 1604 may include means for measuring the set of sensing signals based on the phase coherence indication by measuring a group of sensing signals of the equal groups of sensing signals having a lowest phase discontinuity existence probability. The phase coherence indication may include a total number of the set of phase coherence discontinuities associated with the set of sensing signals. The phase coherence indication may include a set of position indications associated with the set of sensing signals. Each of the set of phase coherence discontinuities may correspond to one of the set of position indications. The set of position indications may include a timestamp or a sensing signal identifier. The apparatus 1604 may include means for measuring the set of sensing signals based on the phase coherence indication by identifying a largest continuous subset of phase coherent sensing signals from the set of sensing signals. The apparatus 1604 may include means for measuring the set of sensing signals based on the phase coherence indication by measuring the largest continuous subset of phase coherent sensing signals. The apparatus 1604 may include means for measuring the set of sensing signals based on the phase coherence indication by identifying a largest continuous subset of phase coherent sensing signals from the set of sensing signals. The apparatus 1604 may include means for measuring the set of sensing signals based on the phase coherence indication by measuring the largest continuous subset of phase coherent sensing signals in response to the largest continuous subset of phase coherent sensing signals having a length larger than a minimum threshold value. The apparatus 1604 may include means for receiving the minimum threshold value from at least one of the first node or a sensing entity. The apparatus 1604 may include means for measuring the set of sensing signals based on the phase coherence indication by identifying a set of continuous subsets of phase coherent sensing signals having a length larger than a minimum threshold value from the set of sensing signals. The apparatus 1604 may include means for measuring the set of sensing signals based on the phase coherence indication by measuring the set of sensing signals based on the set of continuous subsets of phase coherent sensing signals. The apparatus 1604 may include means for measuring the set of sensing signals based on the set of continuous subsets of phase coherent sensing signals by measuring each of the set of continuous subsets of phase coherent sensing signals. The apparatus 1604 may include means for measuring each of the set of continuous subsets of phase coherent sensing signals by averaging each of the measured set of continuous subsets of phase coherent sensing signals. The apparatus 1604 may include means for measuring each of the set of continuous subsets of phase coherent sensing signals by ordering each of the measured set of continuous subsets of phase coherent sensing signals by a respective length of each of the set of continuous subsets of phase coherent sensing signals. The apparatus 1604 may include means for transmitting a sensing report based on the measured set of sensing and the phase coherence indication signals to a sensing entity. The sensing report may include at least one of a length of a measured continuous subset of phase coherent sensing signals of the set of sensing signals or an average length of a set of measured continuous subsets of phase coherent sensing signals of the set of sensing signals. The apparatus 1604 may include means for receiving the set of sensing signals by receiving a modified configuration to increase a number of the set of sensing signals based on a minimum threshold number of continuous phase coherent sensing signals. The apparatus 1604 may include means for calculating an increase to the number of the set of sensing signals based on the minimum threshold number of continuous phase coherent sensing signals and the phase coherence indication. The means may be the component 199 of the apparatus 1604 configured to perform the functions recited by the means. As described supra, the apparatus 1604 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 17:
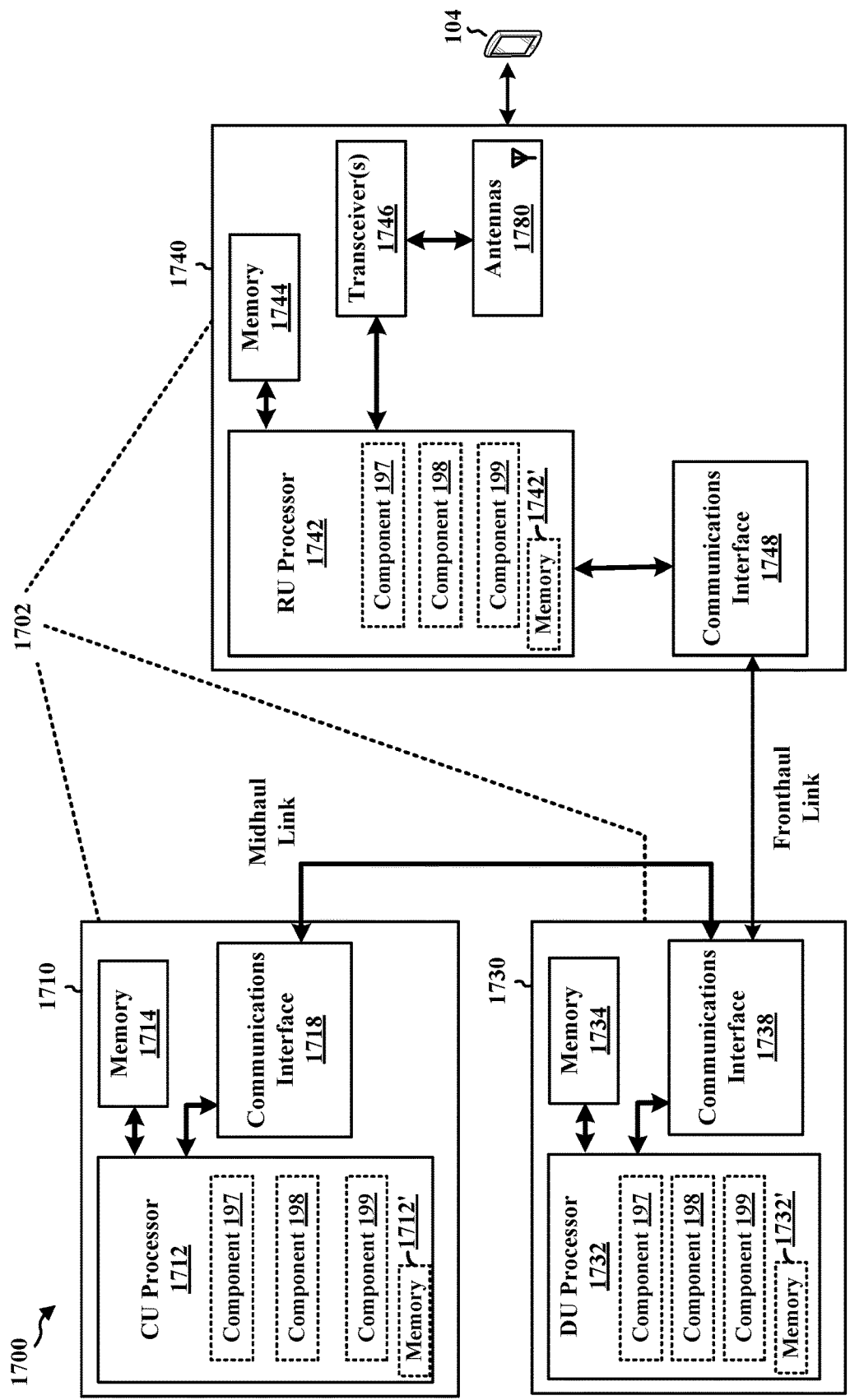
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to transmit a set of sensing signals. The component 198 may be configured to transmit a phase coherence indication based on a set of phase coherence discontinuities associated with the set of sensing signals to a second node. The component 198 may be within one or more processors of one or more of the CU 1710, DU 1730, and the RU 1740. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for transmitting a set of sensing signals. The network entity 1702 may include means for transmitting a phase coherence indication based on a set of phase coherence discontinuities associated with the set of sensing signals to a second node. The network entity 1702 may include means for transmitting a communication signal between a first transmission of a first sensing signal of the set of sensing signals and a second transmission of a second sensing signal of the set of sensing signals. The network entity 1702 may include means for transmitting the phase coherence indication by transmitting the phase coherence indication in response to the transmission of the communication signal between the first transmission and the second transmission. The network entity 1702 may include means for tracking a phase continuity of the set of sensing signals. The network entity 1702 may include means for transmitting the phase coherence indication by transmitting the phase coherence indication in response to detecting at least one of the set of phase coherence discontinuities. The network entity 1702 may include one of a TRP, a UE, a sensing reference unit, or a positioning reference unit. The set of sensing signals may include a PRS or an SRS. The network entity 1702 may include means for transmitting the phase coherence indication by transmitting the phase coherence indication to at least one of the second node or a sensing entity. The network entity 1702 may include means for transmitting the phase coherence indication by transmitting the phase coherence indication after transmitting the set of sensing signals. The phase coherence indication may include a binary indication of an existence or an absence of a phase coherence discontinuity associated with the set of sensing signals. The phase coherence indication may include a total number of the set of phase coherence discontinuities associated with the set of sensing signals. The phase coherence indication may include a set of position indications associated with the set of sensing signals. Each of the set of phase coherence discontinuities may correspond to one of the set of position indications. The set of position indications may include a timestamp or a sensing signal identifier. The network entity 1702 may include means for transmitting the set of sensing signals by initiating a transmission of a continuous subset of phase coherent sensing signals in response to detecting a phase coherence discontinuity of the set of phase coherence discontinuities. The continuous subset of phase coherent sensing signals may include a minimum threshold number of continuous phase coherent sensing signals. The network entity 1702 may include means for receiving an indication of the minimum threshold number from a sensing entity. The network entity 1702 may include means for transmitting the set of sensing signals by repeating the initiation of the transmission of the continuous subset of phase coherent sensing signals in response to failing to transmit the continuous subset of sensing signals. The network entity 1702 may include means for transmitting the set of sensing signals by stopping transmission of the set of sensing signals in response to failing to transmit the continuous subset of sensing signals a maximum threshold number of times. The network entity 1702 may include means for reserving a set of resources associated with the minimum threshold number of continuous phase coherent sensing signals in response to initiating the transmission of the continuous subset of phase coherent sensing signals. The network entity 1702 may include means for releasing the set of resources in response to failing to transmit the continuous subset of sensing signals. The means may be the component 198 of the network entity 1702 configured to perform the functions recited by the means. As described supra, the network entity 1702 may include the Tx processor 316, the Rx processor 370, and the controller/processor 375. As such, in one configuration, the means may be the Tx processor 316, the Rx processor 370, and/or the controller/processor 375 configured to perform the functions recited by the means.

As discussed supra, the component 199 may be configured to receive a set of sensing signals. The component 199 may be configured to receive a phase coherence indication based on a set of phase coherence discontinuities associated with the set of sensing signals from a first node. The component 199 may be configured to measure the set of sensing signals based on the phase coherence indication. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for receiving a set of sensing signals from a first node. The network entity 1702 may include means for receiving a phase coherence indication based on a set of phase coherence discontinuities associated with the set of sensing signals. The network entity 1702 may include means for measuring the set of sensing signals based on the phase coherence indication. The network entity 1702 may include one of a TRP, a UE, a sensing reference unit, or a positioning reference unit. The set of sensing signals may include a PRS or an SRS. The network entity 1702 may include means for receiving the phase coherence indication by receiving the phase coherence indication after receiving the set of sensing signals. The network entity 1702 may include means for receiving the phase coherence indication by receiving the phase coherence indication between receiving a first sensing signal of the set of sensing signals and receiving a second signal of the set of sensing signals. The phase coherence indication may include a binary indication of an existence or an absence of a phase coherence discontinuity associated with the set of sensing signals. The network entity 1702 may include means for measuring the set of sensing signals based on the phase coherence indication by dividing the set of sensing signals into equal groups of sensing signals. The network entity 1702 may include means for measuring the set of sensing signals based on the phase coherence indication by calculating a phase discontinuity existence probability for each equal group of sensing signals. The network entity 1702 may include means for measuring the set of sensing signals based on the phase coherence indication by measuring a group of sensing signals of the equal groups of sensing signals having a lowest phase discontinuity existence probability. The phase coherence indication may include a total number of the set of phase coherence discontinuities associated with the set of sensing signals. The phase coherence indication may include a set of position indications associated with the set of sensing signals. Each of the set of phase coherence discontinuities may correspond to one of the set of position indications. The set of position indications may include a timestamp or a sensing signal identifier. The network entity 1702 may include means for measuring the set of sensing signals based on the phase coherence indication by identifying a largest continuous subset of phase coherent sensing signals from the set of sensing signals. The network entity 1702 may include means for measuring the set of sensing signals based on the phase coherence indication by measuring the largest continuous subset of phase coherent sensing signals. The network entity 1702 may include means for measuring the set of sensing signals based on the phase coherence indication by identifying a largest continuous subset of phase coherent sensing signals from the set of sensing signals. The network entity 1702 may include means for measuring the set of sensing signals based on the phase coherence indication by measuring the largest continuous subset of phase coherent sensing signals in response to the largest continuous subset of phase coherent sensing signals having a length larger than a minimum threshold value. The network entity 1702 may include means for receiving the minimum threshold value from at least one of the first node or a sensing entity. The network entity 1702 may include means for measuring the set of sensing signals based on the phase coherence indication by identifying a set of continuous subsets of phase coherent sensing signals having a length larger than a minimum threshold value from the set of sensing signals. The network entity 1702 may include means for measuring the set of sensing signals based on the phase coherence indication by measuring the set of sensing signals based on the set of continuous subsets of phase coherent sensing signals. The network entity 1702 may include means for measuring the set of sensing signals based on the set of continuous subsets of phase coherent sensing signals by measuring each of the set of continuous subsets of phase coherent sensing signals. The network entity 1702 may include means for measuring each of the set of continuous subsets of phase coherent sensing signals by averaging each of the measured set of continuous subsets of phase coherent sensing signals. The network entity 1702 may include means for measuring each of the set of continuous subsets of phase coherent sensing signals by ordering each of the measured set of continuous subsets of phase coherent sensing signals by a respective length of each of the set of continuous subsets of phase coherent sensing signals. The network entity 1702 may include means for transmitting a sensing report based on the measured set of sensing signals and the phase coherence indication to a sensing entity. The sensing report may include at least one of a length of a measured continuous subset of phase coherent sensing signals of the set of sensing signals or an average length of a set of measured continuous subsets of phase coherent sensing signals of the set of sensing signals. The network entity 1702 may include means for receiving the set of sensing signals by receiving a modified configuration to increase a number of the set of sensing signals based on a minimum threshold number of continuous phase coherent sensing signals. The network entity 1702 may include means for calculating an increase to the number of the set of sensing signals based on the minimum threshold number of continuous phase coherent sensing signals and the phase coherence indication. The means may be the component 199 of the network entity 1702 configured to perform the functions recited by the means. As described supra, the network entity 1702 may include the Tx processor 316, the Rx processor 370, and the controller/processor 375. As such, in one configuration, the means may be the Tx processor 316, the Rx processor 370, and/or the controller/processor 375 configured to perform the functions recited by the means.

As discussed supra, the component 197 may be configured to obtain an indication of a set of phase coherence discontinuities associated with a set of sensing signals. The component 197 may be configured to transmit a sub-CPI configuration to at least one of a transmitter node or a receiver node based on the indication of the set of phase coherence discontinuities. The component 197 may be within one or more processors of one or more of the CU 1710, DU 1730, and the RU 1740. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for obtaining an indication of a set of phase coherence discontinuities associated with a set of sensing signals. The network entity 1702 may include means for transmitting a sub-CPI configuration to at least one of a transmitter node or a receiver node based on the indication of the set of phase coherence discontinuities. The network entity 1702 may include means for obtaining the indication by receiving the indication from a transmitter node or the receiver node. The network entity 1702 may include means for obtaining the indication by receiving the set of sensing signals. The network entity 1702 may include means for obtaining the indication by measuring the set of sensing signals to identify at least one of the set of phase coherence discontinuities. The sub-CPI configuration may include a minimum threshold value of a continuous subset of phase coherent sensing signals to measure. The sub-CPI configuration may include an indication to average a set of continuous subsets of phase coherent sensing signals having a length larger than the minimum threshold value. The network entity 1702 may include means for the sub-CPI configuration may include an indication to average a set of continuous subsets of phase coherent sensing signals having a length larger than the minimum threshold value. The network entity 1702 may include means for fusing the sensing report with a set of other sensing reports received from network nodes different from the receiver node. The sensing report may include at least one of a length of a measured continuous subset of phase coherent sensing signals of the set of sensing signals or an average length of a set of measured continuous subsets of phase coherent sensing signals of the set of sensing signals. The network entity 1702 may include means for fusing the sensing report with the set of other sensing reports based on at least one of the length of the measured continuous subset of phase coherent sensing signals or the average length of the set of measured continuous subsets of phase coherent sensing signals. The network entity 1702 may include means for receiving a sensing report from the receiver node based on the sub-CPI configuration. The network entity 1702 may include means for generating at least one of a range-Doppler angle map or a point cloud based on the sensing report and the sub-CPI configuration. The means may be the component 197 of the network entity 1702 configured to perform the functions recited by the means. As described supra, the network entity 1702 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 18:
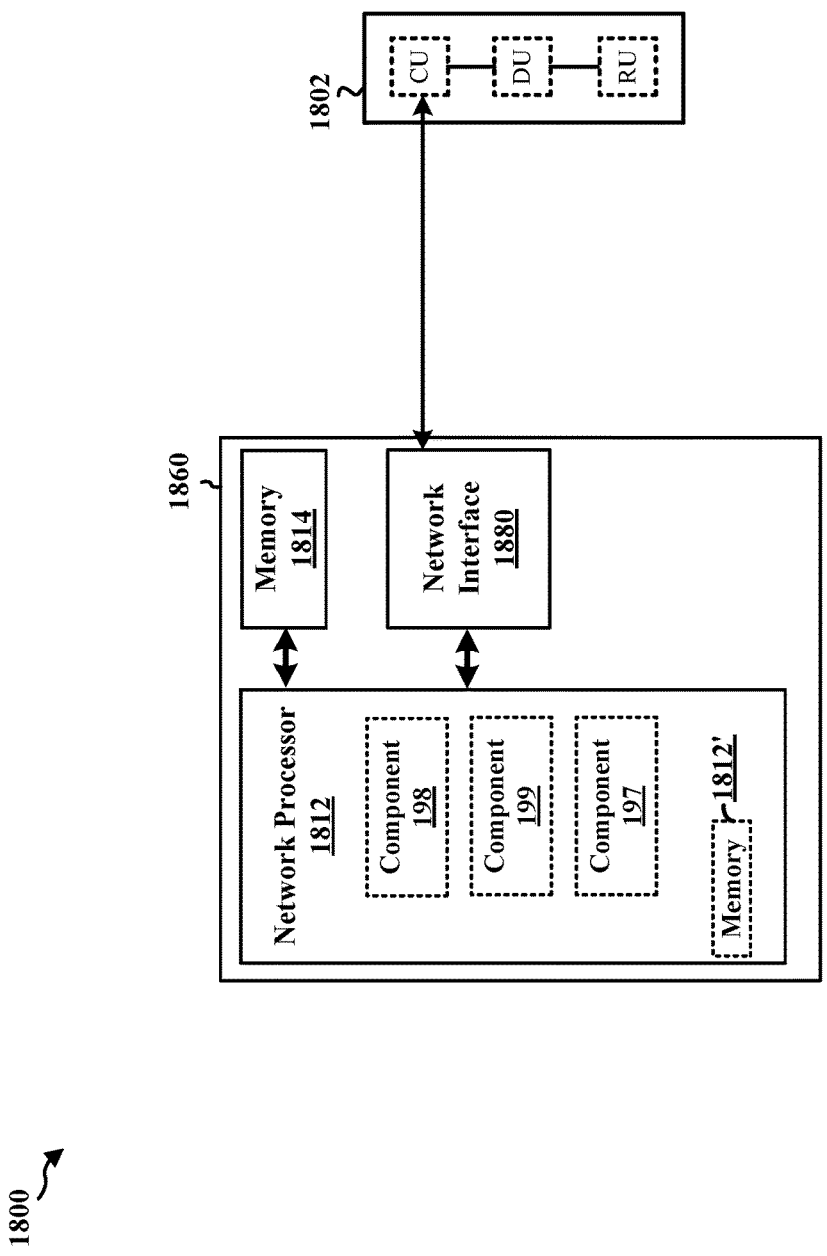
FIG. 18 is a diagram illustrating an example of a hardware implementation for an example network entity.

FIG. 18 is a diagram 1800 illustrating an example of a hardware implementation for a network entity 1860. In one example, the network entity 1860 may be within the core network 120. The network entity 1860 may include a network processor 1812. The network processor 1812 may include on-chip memory 1812'. In some aspects, the network entity 1860 may further include additional memory modules 1814. The network entity 1860 communicates via the network interface 1880 directly (e.g., backhaul link) or indirectly (e.g., through a RIC) with the CU 1802. The on-chip memory 1812' and the additional memory modules 1814 may each be considered a computer-readable medium/memory. Each computer-readable medium/memory may be non-transitory. The processor 1812 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to transmit a set of sensing signals to a second node. The component 198 may be configured to sensing signal transmission component 198. The component 198 may be within the processor 1812. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1860 may include a variety of components configured for various functions. In one configuration, the network entity 1860 may include means for transmitting a set of sensing signals to a second node. The network entity 1860 may include means for transmitting a phase coherence indication based on a set of phase coherence discontinuities associated with the set of sensing signals. The network entity 1860 may include means for transmitting a communication signal between a first transmission of a first sensing signal of the set of sensing signals and a second transmission of a second sensing signal of the set of sensing signals. The network entity 1860 may include means for transmitting the phase coherence indication by transmitting the phase coherence indication in response to the transmission of the communication signal between the first transmission and the second transmission. The network entity 1860 may include means for tracking a phase continuity of the set of sensing signals. The network entity 1860 may include means for transmitting the phase coherence indication by transmitting the phase coherence indication in response to detecting at least one of the set of phase coherence discontinuities. The network entity 1860 may include one of a TRP, a UE, a sensing reference unit, or a positioning reference unit. The set of sensing signals may include a PRS or an SRS. The network entity 1860 may include means for transmitting the phase coherence indication by transmitting the phase coherence indication to at least one of the second node or a sensing entity. The network entity 1860 may include means for transmitting the phase coherence indication by transmitting the phase coherence indication after transmitting the set of sensing signals. The phase coherence indication may include a binary indication of an existence or an absence of a phase coherence discontinuity associated with the set of sensing signals. The phase coherence indication may include a total number of the set of phase coherence discontinuities associated with the set of sensing signals. The phase coherence indication may include a set of position indications associated with the set of sensing signals. Each of the set of phase coherence discontinuities may correspond to one of the set of position indications. The set of position indications may include a timestamp or a sensing signal identifier. The network entity 1860 may include means for transmitting the set of sensing signals by initiating a transmission of a continuous subset of phase coherent sensing signals in response to detecting a phase coherence discontinuity of the set of phase coherence discontinuities. The continuous subset of phase coherent sensing signals may include a minimum threshold number of continuous phase coherent sensing signals. The network entity 1860 may include means for receiving an indication of the minimum threshold number from a sensing entity. The network entity 1860 may include means for transmitting the set of sensing signals by repeating the initiation of the transmission of the continuous subset of phase coherent sensing signals in response to failing to transmit the continuous subset of sensing signals. The network entity 1860 may include means for transmitting the set of sensing signals by stopping transmission of the set of sensing signals in response to failing to transmit the continuous subset of sensing signals a maximum threshold number of times. The network entity 1860 may include means for reserving a set of resources associated with the minimum threshold number of continuous phase coherent sensing signals in response to initiating the transmission of the continuous subset of phase coherent sensing signals. The network entity 1860 may include means for releasing the set of resources in response to failing to transmit the continuous subset of sensing signals. The means may be the component 198 of the network entity 1860 configured to perform the functions recited by the means.

As discussed supra, the component 199 may be configured to receive a set of sensing signals from a first node. The component 199 may be configured to receive a phase coherence indication based on a set of phase coherence discontinuities associated with the set of sensing signals. The component 199 may be configured to measure the set of sensing signals based on the phase coherence indication. The component 199 may be within the processor 1812. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1860 may include a variety of components configured for various functions. In one configuration, the network entity 1860 may include means for receiving a set of sensing signals from a first node. The network entity 1860 may include means for receiving a phase coherence indication based on a set of phase coherence discontinuities associated with the set of sensing signals. The network entity 1860 may include means for measuring the set of sensing signals based on the phase coherence indication. The network entity 1860 may include one of a TRP, a UE, a sensing reference unit, or a positioning reference unit. The set of sensing signals may include a PRS or an SRS. The network entity 1860 may include means for receiving the phase coherence indication by receiving the phase coherence indication after receiving the set of sensing signals. The network entity 1860 may include means for receiving the phase coherence indication by receiving the phase coherence indication between receiving a first sensing signal of the set of sensing signals and receiving a second signal of the set of sensing signals. The phase coherence indication may include a binary indication of an existence or an absence of a phase coherence discontinuity associated with the set of sensing signals. The network entity 1860 may include means for measuring the set of sensing signals based on the phase coherence indication by dividing the set of sensing signals into equal groups of sensing signals. The network entity 1860 may include means for measuring the set of sensing signals based on the phase coherence indication by calculating a phase discontinuity existence probability for each equal group of sensing signals. The network entity 1860 may include means for measuring the set of sensing signals based on the phase coherence indication by measuring a group of sensing signals of the equal groups of sensing signals having a lowest phase discontinuity existence probability. The phase coherence indication may include a total number of the set of phase coherence discontinuities associated with the set of sensing signals. The phase coherence indication may include a set of position indications associated with the set of sensing signals. Each of the set of phase coherence discontinuities may correspond to one of the set of position indications. The set of position indications may include a timestamp or a sensing signal identifier. The network entity 1860 may include means for measuring the set of sensing signals based on the phase coherence indication by identifying a largest continuous subset of phase coherent sensing signals from the set of sensing signals. The network entity 1860 may include means for measuring the set of sensing signals based on the phase coherence indication by measuring the largest continuous subset of phase coherent sensing signals. The network entity 1860 may include means for measuring the set of sensing signals based on the phase coherence indication by identifying a largest continuous subset of phase coherent sensing signals from the set of sensing signals. The network entity 1860 may include means for measuring the set of sensing signals based on the phase coherence indication by measuring the largest continuous subset of phase coherent sensing signals in response to the largest continuous subset of phase coherent sensing signals having a length larger than a minimum threshold value. The network entity 1860 may include means for receiving the minimum threshold value from at least one of the first node or a sensing entity. The network entity 1860 may include means for measuring the set of sensing signals based on the phase coherence indication by identifying a set of continuous subsets of phase coherent sensing signals having a length larger than a minimum threshold value from the set of sensing signals. The network entity 1860 may include means for measuring the set of sensing signals based on the phase coherence indication by measuring the set of sensing signals based on the set of continuous subsets of phase coherent sensing signals. The network entity 1860 may include means for measuring the set of sensing signals based on the set of continuous subsets of phase coherent sensing signals by measuring each of the set of continuous subsets of phase coherent sensing signals. The network entity 1860 may include means for measuring each of the set of continuous subsets of phase coherent sensing signals by averaging each of the measured set of continuous subsets of phase coherent sensing signals. The network entity 1860 may include means for measuring each of the set of continuous subsets of phase coherent sensing signals by ordering each of the measured set of continuous subsets of phase coherent sensing signals by a respective length of each of the set of continuous subsets of phase coherent sensing signals. The network entity 1860 may include means for transmitting a sensing report based on the measured set of sensing signals and the phase coherence indication to a sensing entity. The sensing report may include at least one of a length of a measured continuous subset of phase coherent sensing signals of the set of sensing signals or an average length of a set of measured continuous subsets of phase coherent sensing signals of the set of sensing signals. The network entity 1860 may include means for receiving the set of sensing signals by receiving a modified configuration to increase a number of the set of sensing signals based on a minimum threshold number of continuous phase coherent sensing signals. The network entity 1860 may include means for calculating an increase to the number of the set of sensing signals based on the minimum threshold number of continuous phase coherent sensing signals and the phase coherence indication. The means may be the component 199 of the network entity 1860 configured to perform the functions recited by the means.

As discussed supra, the component 197 may be configured to obtain an indication of a set of phase coherence discontinuities associated with a set of sensing signals. The component 197 may be configured to transmit a sub-CPI configuration to at least one of a transmitter node or a receiver node based on the indication of the set of phase coherence discontinuities. The component 197 may be within the processor 1812. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1860 may include a variety of components configured for various functions. In one configuration, the network entity 1860 may include means for obtaining an indication of a set of phase coherence discontinuities associated with a set of sensing signals. The network entity 1860 may include means for transmitting a sub-CPI configuration to at least one of a transmitter node or a receiver node based on the indication of the set of phase coherence discontinuities. The network entity 1860 may include means for obtaining the indication by receiving the indication from a transmitter node or the receiver node. The network entity 1860 may include means for obtaining the indication by receiving the set of sensing signals. The network entity 1860 may include means for obtaining the indication by measuring the set of sensing signals to identify at least one of the set of phase coherence discontinuities. The sub-CPI configuration may include a minimum threshold value of a continuous subset of phase coherent sensing signals to measure. The sub-CPI configuration may include an indication to average a set of continuous subsets of phase coherent sensing signals having a length larger than the minimum threshold value. The network entity 1860 may include means for the sub-CPI configuration may include an indication to average a set of continuous subsets of phase coherent sensing signals having a length larger than the minimum threshold value. The network entity 1860 may include means for fusing the sensing report with a set of other sensing reports received from network nodes different from the receiver node. The sensing report may include at least one of a length of a measured continuous subset of phase coherent sensing signals of the set of sensing signals or an average length of a set of measured continuous subsets of phase coherent sensing signals of the set of sensing signals. The network entity 1860 may include means for fusing the sensing report with the set of other sensing reports based on at least one of the length of the measured continuous subset of phase coherent sensing signals or the average length of the set of measured continuous subsets of phase coherent sensing signals. The network entity 1860 may include means for receiving a sensing report from the receiver node based on the sub-CPI configuration. The network entity 1860 may include means for generating at least one of a range-doppler angle map or a point cloud based on the sensing report and the sub-CPI configuration. The means may be the component 197 of the network entity 1860 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, may send the data to a device that transmits the data, or may send the data to a module of the device. A device configured to "obtain" data, such as a transmission, signal, or message, may receive, for example with a transceiver, may obtain the data from a device that receives the data, or may obtain the data from a module of the device.

The following aspects are illustrative only and may be combined with other aspects or teachings described herein, without limitation.

Aspect 1 is a method of wireless communication at a first node, where the method may include transmitting a set of sensing signals to a second node. The method may include transmitting a phase coherence indication based on a set of phase coherence discontinuities associated with the set of sensing signals.

Aspect 2 is the method of aspect 1, where the method may include transmitting a communication signal between a first transmission of a first sensing signal of the set of sensing signals and a second transmission of a second sensing signal of the set of sensing signals. Transmitting the phase coherence indication may include transmitting the phase coherence indication in response to the transmission of the communication signal between the first transmission and the second transmission.

Aspect 3 is the method of either of aspects 1 or 2, where the method may include tracking a phase continuity of the set of sensing signals. Transmitting the phase coherence indication may include transmitting the phase coherence indication in response to detecting at least one of the set of phase coherence discontinuities.

Aspect 4 is the method of any of aspects 1 to 3, where the first node may include one of a TRP, a UE, a sensing reference unit, or a positioning reference unit.

Aspect 5 is the method of any of aspects 1 to 4, where the set of sensing signals may include a PRS or an SRS.

Aspect 6 is the method of any of aspects 1 to 5, where transmitting the phase coherence indication may include transmitting the phase coherence indication to at least one of the second node or a sensing entity.

Aspect 7 is the method of any of aspects 1 to 6, where transmitting the phase coherence indication may include transmitting the phase coherence indication after transmitting the set of sensing signals.

Aspect 8 is the method of any of aspects 1 to 7, where the phase coherence indication may include a binary indication of an existence or an absence of a phase coherence discontinuity associated with the set of sensing signals.

Aspect 9 is the method of any of aspects 1 to 8, where the phase coherence indication may include a total number of the set of phase coherence discontinuities associated with the set of sensing signals.

Aspect 10 is the method of aspect 9, where the phase coherence indication may include a set of position indications associated with the set of sensing signals. Each of the set of phase coherence discontinuities may correspond to one of the set of position indications.

Aspect 11 is the method of aspect 10, where the set of position indications may include a timestamp or a sensing signal identifier.

Aspect 12 is the method of any of aspects 1 to 11, where transmitting the set of sensing signals may include initiating a transmission of a continuous subset of phase coherent sensing signals in response to detecting a phase coherence discontinuity of the set of phase coherence discontinuities. The continuous subset of phase coherent sensing signals may include a minimum threshold number of continuous phase coherent sensing signals.

Aspect 13 is the method of aspect 12, where the method may include receiving an indication of the minimum threshold number from a sensing entity.

Aspect 14 is the method of either of aspects 12 or 13, where transmitting the set of sensing signals may include repeating the initiation of the transmission of the continuous subset of phase coherent sensing signals in response to failing to transmit the continuous subset of sensing signals. Transmitting the set of sensing signals may include stopping transmission of the set of sensing signals in response to failing to transmit the continuous subset of sensing signals a maximum threshold number of times.

Aspect 15 is the method of any of aspects 12 to 14, where the method may include reserving a set of resources associated with the minimum threshold number of continuous phase coherent sensing signals in response to initiating the transmission of the continuous subset of phase coherent sensing signals. The method may include releasing the set of resources in response to failing to transmit the continuous subset of sensing signals.

Aspect 16 is a method of wireless communication at a second node, where the method may include receiving a set of sensing signals from a first node. The method may include receiving a phase coherence indication based on a set of phase coherence discontinuities associated with the set of sensing signals. The method may include measuring the set of sensing signals based on the phase coherence indication.

Aspect 17 is the method of aspect 16, where the second node may include one of a TRP, a UE, a sensing reference unit, or a positioning reference unit.

Aspect 18 is the method of either of aspects 16 or 17, where the set of sensing signals may include a PRS or an SRS.

Aspect 19 is the method of any of aspects 16 to 18, where receiving the phase coherence indication may include receiving the phase coherence indication after receiving the set of sensing signals.

Aspect 20 is the method of any of aspects 16 to 19, where receiving the phase coherence indication may include receiving the phase coherence indication between receiving a first sensing signal of the set of sensing signals and receiving a second signal of the set of sensing signals.

Aspect 21 is the method of any of aspects 16 to 20, the phase coherence indication may include a binary indication of an existence or an absence of a phase coherence discontinuity associated with the set of sensing signals.

Aspect 22 is the method of aspect 21, where measuring the set of sensing signals based on the phase coherence indication may include dividing the set of sensing signals into equal groups of sensing signals. Measuring the set of sensing signals based on the phase coherence indication may include calculating a phase discontinuity existence probability for each equal group of sensing signals. Measuring the set of sensing signals based on the phase coherence indication may include measuring a group of sensing signals of the equal groups of sensing signals having a lowest phase discontinuity existence probability.

Aspect 23 is the method of any of aspects 16 and 22, where the phase coherence indication may include a total number of the set of phase coherence discontinuities associated with the set of sensing signals.

Aspect 24 is the method of aspect 23, where the phase coherence indication may include a set of position indications associated with the set of sensing signals. Each of the set of phase coherence discontinuities may correspond to one of the set of position indications.

Aspect 25 is the method of aspect 24, where the set of position indications may include a timestamp or a sensing signal identifier.

Aspect 26 is the method of any of aspects 16 to 25, where measuring the set of sensing signals based on the phase coherence indication may include identifying a largest continuous subset of phase coherent sensing signals from the set of sensing signals. Measuring the set of sensing signals based on the phase coherence indication may include measuring the largest continuous subset of phase coherent sensing signals.

Aspect 27 is the method of any of aspects 16 to 26, where measuring the set of sensing signals based on the phase coherence indication may include identifying a largest continuous subset of phase coherent sensing signals from the set of sensing signals. Measuring the set of sensing signals based on the phase coherence indication may include measuring the largest continuous subset of phase coherent sensing signals in response to the largest continuous subset of phase coherent sensing signals having a length larger than a minimum threshold value.

Aspect 28 is the method of aspect 27, where the method may include receiving the minimum threshold value from at least one of the first node or a sensing entity.

Aspect 29 is the method of any of aspects 16 to 28, where measuring the set of sensing signals based on the phase coherence indication may include identifying a set of continuous subsets of phase coherent sensing signals having a length larger than a minimum threshold value from the set of sensing signals. Measuring the set of sensing signals based on the phase coherence indication may include measuring the set of sensing signals based on the set of continuous subsets of phase coherent sensing signals.

Aspect 30 is the method of aspect 29, measuring the set of sensing signals based on the set of continuous subsets of phase coherent sensing signals may include measuring each of the set of continuous subsets of phase coherent sensing signals. Measuring each of the set of continuous subsets of phase coherent sensing signals may include averaging each of the measured set of continuous subsets of phase coherent sensing signals.

Aspect 31 is the method of aspect 30, where measuring each of the set of continuous subsets of phase coherent sensing signals may include ordering each of the measured set of continuous subsets of phase coherent sensing signals by a respective length of each of the set of continuous subsets of phase coherent sensing signals.

Aspect 32 is the method of any of aspects 16 to 31, where the method may include transmitting a sensing report based on the measured set of sensing signals and the phase coherence indication to a sensing entity.

Aspect 33 is the method of aspect 32, where the sensing report may include at least one of a length of a measured continuous subset of phase coherent sensing signals of the set of sensing signals or an average length of a set of measured continuous subsets of phase coherent sensing signals of the set of sensing signals.

Aspect 34 is the method of any of aspects 16 to 33, where receiving the set of sensing signals may include receiving a modified configuration to increase a number of the set of sensing signals based on a minimum threshold number of continuous phase coherent sensing signals.

Aspect 35 is the method of aspect 34, where the method may include calculating an increase to the number of the set of sensing signals based on the minimum threshold number of continuous phase coherent sensing signals and the phase coherence indication.

Aspect 36 is a method of wireless communication at a sensing entity, where the method may include obtaining an indication of a set of phase coherence discontinuities associated with a set of sensing signals. The method may include transmitting a sub-CPI configuration to at least one of a transmitter node or a receiver node based on the indication of the set of phase coherence discontinuities.

Aspect 37 is the method of aspect 36, where obtaining the indication may include receiving the indication from a transmitter node or the receiver node.

Aspect 38 is the method of either of aspects 36 or 37, where obtaining the indication may include receiving the set of sensing signals. Obtaining the indication may include measuring the set of sensing signals to identify at least one of the set of phase coherence discontinuities.

Aspect 39 is the method of any of aspects 36 to 38, where the sub-CPI configuration may include a minimum threshold value of a continuous subset of phase coherent sensing signals to measure.

Aspect 40 is the method of aspect 39, where the sub-CPI configuration may include an indication to average a set of continuous subsets of phase coherent sensing signals having a length larger than the minimum threshold value.

Aspect 41 is the method of any of aspects 36 to 40, where the method may include receiving a sensing report from the receiver node based on the sub-CPI configuration. The method may include fusing the sensing report with a set of other sensing reports received from network nodes different from the receiver node.

Aspect 42 is the method of aspect 41, where the sensing report may include at least one of a length of a measured continuous subset of phase coherent sensing signals of the set of sensing signals or an average length of a set of measured continuous subsets of phase coherent sensing signals of the set of sensing signals. Fusing the sensing report with the set of other sensing reports may be based on at least one of the length of the measured continuous subset of phase coherent sensing signals or the average length of the set of measured continuous subsets of phase coherent sensing signals.

Aspect 43 is the method of any of aspects 36 to 42, where the method may include receiving a sensing report from the receiver node based on the sub-CPI configuration. The method may include generating at least one of a range-doppler angle map or a point cloud based on the sensing report and the sub-CPI configuration.

Aspect 44 is an apparatus for wireless communication, including: a memory; and at least one processor coupled to the memory and, based at least in part on information stored in the memory, the at least one processor is configured to implement any of aspects 1 to 43.

Aspect 45 is the apparatus of aspect 44, further including at least one of an antenna or a transceiver coupled to the at least one processor.

Aspect 46 is an apparatus for wireless communication including means for implementing any of aspects 1 to 43.

Aspect 47 is a computer-readable medium (e.g., a non-transitory computer-readable medium) storing computer executable code, where the code when executed by a processor causes the processor to implement any of aspects 1 to 43.

What is claimed is:

1. An apparatus for wireless communication at a first node, comprising:
   one or more memories; and
   one or more processors coupled to the one or more memories and, based at least in part on information stored in the one or more memories, the one or more processors is configured to:
   transmit a set of sensing signals;
   track a phase continuity of the transmitted set of sensing signals; and
   transmit, for a second node, a phase coherence indication in response to a detection of at least one phase discontinuity of a set of phase coherence discontinuities.

2. The apparatus of claim 1, further comprising a transceiver coupled to the one or more processors, wherein the one or more processors is further configured to:
   transmit, via the transceiver, a communication signal between a first transmission of a first sensing signal of the set of sensing signals and a second transmission of a second sensing signal of the set of sensing signals, wherein, to transmit the phase coherence indication, the one or more processors is configured to:
   transmit the phase coherence indication in response to the transmission of the communication signal between the first transmission and the second transmission.

3. The apparatus of claim 1, wherein the first node comprises one of a transmission reception point (TRP), a user equipment (UE), a sensing reference unit, or a positioning reference unit.

4. The apparatus of claim 1, wherein, to transmit the phase coherence indication, the one or more processors is configured to:
   transmit the phase coherence indication to at least one of the second node or a sensing entity.

5. The apparatus of claim 1, wherein, to transmit the phase coherence indication, the one or more processors is configured to:
   transmit the phase coherence indication after transmitting the set of sensing signals.

6. The apparatus of claim 1, wherein, to transmit the set of sensing signals, the one or more processors is configured to:
   initiate a transmission of a continuous subset of phase coherent sensing signals in response to detecting a phase coherence discontinuity of the set of phase coherence discontinuities, wherein the continuous subset of phase coherent sensing signals comprises a minimum threshold number of continuous phase coherent sensing signals.

7. The apparatus of claim 6, wherein the one or more processors is further configured to:
receive an indication of the minimum threshold number from a sensing entity.

8. The apparatus of claim 6, wherein, to transmit the set of sensing signals, the one or more processors is further configured to:
repeat the initiation of the transmission of the continuous subset of phase coherent sensing signals in response to failing to transmit the continuous subset of sensing signals; and
stop transmission of the set of sensing signals in response to failing to transmit the continuous subset of sensing signals a maximum threshold number of times.

9. The apparatus of claim 6, wherein the one or more processors is further configured to:
reserve a set of resources associated with the minimum threshold number of continuous phase coherent sensing signals in response to initiating the transmission of the continuous subset of phase coherent sensing signals; and
release the set of resources in response to failing to transmit the continuous subset of sensing signals.

10. An apparatus for wireless communication at a second node, comprising:
one or more memories; and
one or more processors coupled to the one or more memories and, based at least in part on information stored in the one or more memories, the one or more processors is configured to:
receive a set of sensing signals;
receive, after a reception of at least one sensing signal of the set of sensing signals, a phase coherence indication based on a set of tracked phase coherence discontinuities associated with the set of sensing signals from a first node; and
measure the set of sensing signals based on the phase coherence indication.

11. The apparatus of claim 10, wherein the second node comprises one of a transmission reception point (TRP), a user equipment (UE), a sensing reference unit, or a positioning reference unit.

12. The apparatus of claim 10, further comprising a transceiver coupled to the at least one processor, wherein, to receive the phase coherence indication, the one or more processors is configured to:
receive, via the transceiver, the phase coherence indication after receiving the set of sensing signals.

13. The apparatus of claim 10, wherein, to receive the phase coherence indication, the one or more processors is configured to:
receive the phase coherence indication between receiving a first sensing signal of the set of sensing signals and receiving a second signal of the set of sensing signals.

14. The apparatus of claim 10, wherein the phase coherence indication comprises a binary indication of an existence or an absence of a phase coherence discontinuity associated with the set of sensing signals.

15. The apparatus of claim 14, wherein, to measure the set of sensing signals based on the phase coherence indication, the one or more processors is configured to:
divide the set of sensing signals into equal groups of sensing signals;
calculate a phase discontinuity existence probability for each equal group of sensing signals; and
measure a group of sensing signals of the equal groups of sensing signals having a lowest phase discontinuity existence probability.

16. The apparatus of claim 15, wherein the phase coherence indication further comprises a set of position indications associated with the set of sensing signals, wherein each of the set of phase coherence discontinuities corresponds to one of the set of position indications.

17. The apparatus of claim 16, wherein the set of position indications comprises a timestamp or a sensing signal identifier.

18. The apparatus of claim 10, wherein, to measure the set of sensing signals based on the phase coherence indication, the one or more processors is configured to:
identify a largest continuous subset of phase coherent sensing signals from the set of sensing signals; and
measure the largest continuous subset of phase coherent sensing signals.

19. The apparatus of claim 10, wherein, to measure the set of sensing signals based on the phase coherence indication, the one or more processors is configured to:
identify a largest continuous subset of phase coherent sensing signals from the set of sensing signals; and
measure the largest continuous subset of phase coherent sensing signals in response to the largest continuous subset of phase coherent sensing signals having a length larger than a minimum threshold value.

20. The apparatus of claim 19, wherein the one or more processors is further configured to:
receive the minimum threshold value from at least one of the first node or a sensing entity.

21. The apparatus of claim 10, wherein, to measure the set of sensing signals based on the phase coherence indication, the one or more processors is configured to:
identify a set of continuous subsets of phase coherent sensing signals having a length larger than a minimum threshold value from the set of sensing signals; and
measure the set of sensing signals based on the set of continuous subsets of phase coherent sensing signals.

22. The apparatus of claim 21, wherein, to measure the set of sensing signals based on the set of continuous subsets of phase coherent sensing signals, the one or more processors is configured to:
measure each of the set of continuous subsets of phase coherent sensing signals; and
average each of the measured set of continuous subsets of phase coherent sensing signals.

23. The apparatus of claim 22, wherein, to measure each of the set of continuous subsets of phase coherent sensing signals, the one or more processors is configured to:
order each of the measured set of continuous subsets of phase coherent sensing signals by a respective length of each of the set of continuous subsets of phase coherent sensing signals.

24. The apparatus of claim 10, wherein the one or more processors is further configured to:
transmit a sensing report based on the measured set of sensing signals and the phase coherence indication to a sensing entity.

25. The apparatus of claim 24, wherein the sensing report comprises at least one of a length of a measured continuous subset of phase coherent sensing signals of the set of sensing signals or an average length of a set of measured continuous subsets of phase coherent sensing signals of the set of sensing signals.

26. The apparatus of claim 10, wherein the one or more processors is further configured to:
  receive a modified configuration to increase a number of the set of sensing signals based on a minimum threshold number of continuous phase coherent sensing signals.

27. The apparatus of claim 26, wherein the one or more processors is further configured to:
  calculate an increase to the number of the set of sensing signals based on the minimum threshold number of continuous phase coherent sensing signals and the phase coherence indication.

28. A method of wireless communication at a first node, comprising:
  transmitting a set of sensing signals;
  tracking a phase continuity of the transmitted set of sensing signals; and
  transmitting a phase coherence indication in response to a detection of at least one phase discontinuity of a set of phase coherence discontinuities to a second node.

29. A method of wireless communication at a second node, comprising:
  receiving a set of sensing signals;
  receiving, after a reception of at least one sensing signal of the set of sensing signals, a phase coherence indication based on a set of tracked phase coherence discontinuities associated with the set of sensing signals from a first node; and
  measuring the set of sensing signals based on the phase coherence indication.

* * * * *